(12) United States Patent
Becker

(10) Patent No.: US 11,776,423 B2
(45) Date of Patent: Oct. 3, 2023

(54) CONNECTION BOXES FOR GAS TUNGSTEN ARC WELDING TRAINING SYSTEMS

(71) Applicant: Illinois Tool Works Inc., Glenview, IL (US)

(72) Inventor: William Joshua Becker, Manitowoc, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 597 days.

(21) Appl. No.: 16/518,398

(22) Filed: Jul. 22, 2019

(65) Prior Publication Data

US 2021/0027657 A1    Jan. 28, 2021

(51) Int. Cl.
| | |
|---|---|
| *G09B 19/24* | (2006.01) |
| *B23K 9/095* | (2006.01) |
| *B23K 9/32* | (2006.01) |
| *G09B 9/00* | (2006.01) |
| *B23K 9/28* | (2006.01) |
| *B23K 37/04* | (2006.01) |

(Continued)

(52) U.S. Cl.
CPC ............ *G09B 19/24* (2013.01); *B23K 9/0953* (2013.01); *B23K 9/0956* (2013.01); *B23K 9/282* (2013.01); *B23K 9/32* (2013.01); *B23K 37/04* (2013.01); *G06F 3/0488* (2013.01); *G09B 9/00* (2013.01); *G09B 19/003* (2013.01)

(58) Field of Classification Search
CPC ........ G09B 19/24; G09B 9/00; B23K 9/0953; B23K 9/0956; B23K 9/32
USPC ......................................................... 434/234
See application file for complete search history.

(56) References Cited

U.S. PATENT DOCUMENTS

| 1,340,270 A | 5/1920 | Emil |
|---|---|---|
| 2,045,800 A | 6/1936 | Walther |

(Continued)

FOREIGN PATENT DOCUMENTS

| CA | 2311685 | 12/2001 |
|---|---|---|
| CA | 2517874 | 12/2001 |

(Continued)

OTHER PUBLICATIONS

Hodgson, et al. "Virtual Reality in the Wild: A Self-Contained and Wearable Simulation System." IEEE Virtual Reality, Mar. 4-8, 2012, Orange County, CA USA.

(Continued)

*Primary Examiner* — Jay Trent Liddle
*Assistant Examiner* — Alyssa N Brandley
(74) *Attorney, Agent, or Firm* — McAndrews, Held & Malloy, Ltd.

(57) ABSTRACT

Connection boxes for gas tungsten arc welding (GTAW) training systems are described. In some examples, a connection box of the GTAW training system coordinates delivery of welding-type power to a GTAW torch during training. In some examples, a remote control (e.g., foot pedal) may be activated at different levels to command different levels of welding-type power be delivered to the GTAW torch from a welding-type power supply. In some examples, the connection box may selectively enable or disable communication between the remote control and welding-type power supply during training. In some examples, this selective enablement/disablement may be based on whether the GTAW training system is in a live-arc mode or simulation mode.

20 Claims, 7 Drawing Sheets

(51) Int. Cl.
  *G06F 3/0488*  (2022.01)
  *G09B 19/00*  (2006.01)

(56) References Cited

U.S. PATENT DOCUMENTS

| | | | |
|---|---|---|---|
| 2,045,801 A | 6/1936 | Richter |
| 2,045,802 A | 6/1936 | Walther |
| 2,333,192 A | 10/1942 | Moberg |
| 2,351,910 A | 6/1944 | Blankenbuehler |
| 3,391,691 A | 7/1968 | Young |
| 3,679,865 A | 7/1972 | Jesnitzer et al. |
| 3,755,648 A | 8/1973 | Buzzetta et al. |
| 3,867,769 A | 2/1975 | Schow et al. |
| 4,028,522 A | 6/1977 | Chihoski et al. |
| 4,041,615 A | 8/1977 | Whitehill |
| 4,044,377 A | 8/1977 | Bowerman |
| 4,124,944 A | 11/1978 | Blair |
| 4,132,014 A | 1/1979 | Schow |
| 4,144,766 A | 3/1979 | Wehrmeister |
| 4,224,501 A | 9/1980 | Lindbom et al. |
| 4,253,648 A | 3/1981 | Meeks |
| 4,294,440 A | 10/1981 | Severt |
| 4,375,026 A | 2/1983 | Kearney |
| 4,375,165 A | 3/1983 | de Sterke |
| 4,389,561 A | 6/1983 | Weman et al. |
| 4,396,945 A | 8/1983 | DiMatteo et al. |
| 4,412,121 A | 10/1983 | Kremers et al. |
| 4,452,589 A | 6/1984 | Denison |
| 4,459,114 A | 7/1984 | Barwick |
| 4,471,207 A | 9/1984 | Hawkes |
| 4,484,059 A | 11/1984 | Lillquist |
| 4,518,361 A | 5/1985 | Conway |
| 4,541,055 A | 9/1985 | Wolfe et al. |
| 4,555,614 A | 11/1985 | Morris et al. |
| 4,577,499 A | 3/1986 | Silke et al. |
| 4,590,356 A | 5/1986 | Povlick et al. |
| 4,591,689 A | 5/1986 | Brown et al. |
| 4,594,497 A | 6/1986 | Takahashi et al. |
| 4,595,186 A | 6/1986 | Reed et al. |
| 4,595,368 A | 6/1986 | Cole |
| 4,595,820 A | 6/1986 | Richardson |
| 4,609,806 A | 9/1986 | Grabkowski et al. |
| 4,628,176 A | 12/1986 | Kojima et al. |
| 4,638,146 A | 1/1987 | Koyama |
| 4,641,292 A | 2/1987 | Tunnell et al. |
| 4,677,277 A | 6/1987 | Cook et al. |
| 4,680,014 A | 7/1987 | Paton et al. |
| 4,689,021 A | 8/1987 | Vasiliev et al. |
| 4,716,273 A | 12/1987 | Paton et al. |
| 4,721,947 A | 1/1988 | Brown |
| 4,728,768 A | 3/1988 | Cueman |
| 4,739,404 A | 4/1988 | Richardson |
| 4,767,109 A | 8/1988 | Raketich |
| 4,829,365 A | 5/1989 | Eichenlaub |
| 4,830,261 A | 5/1989 | Mello et al. |
| 4,867,685 A | 9/1989 | Brush et al. |
| 4,868,649 A | 9/1989 | Gaudin |
| 4,877,940 A | 10/1989 | Bangs et al. |
| 4,881,678 A | 11/1989 | Gaudin |
| 4,920,249 A | 4/1990 | McLaughlin et al. |
| 4,931,018 A | 6/1990 | Herbst et al. |
| 4,937,427 A | 6/1990 | McVicker |
| 4,943,702 A | 7/1990 | Richardson |
| 4,954,690 A | 9/1990 | Kensrue |
| 4,992,881 A | 2/1991 | Tomasek et al. |
| 4,996,409 A | 2/1991 | Paton et al. |
| 5,061,841 A | 10/1991 | Richardson |
| 5,103,376 A | 4/1992 | Blonder |
| 5,185,561 A | 2/1993 | Good et al. |
| 5,208,436 A | 5/1993 | Blankenship |
| 5,211,564 A | 8/1993 | Martinez et al. |
| 5,231,928 A | 8/1993 | Phillips et al. |
| 5,243,265 A | 9/1993 | Matsuura et al. |
| 5,283,418 A | 2/1994 | Bellows et al. |
| 5,302,799 A | 4/1994 | Kennedy et al. |
| 5,304,774 A | 4/1994 | Durheim |
| 5,306,893 A | 4/1994 | Morris et al. |
| 5,320,538 A | 6/1994 | Baum |
| 5,343,011 A | 8/1994 | Fujii et al. |
| 5,369,356 A | 11/1994 | Kinney et al. |
| 5,380,978 A | 1/1995 | Pryor |
| 5,397,872 A | 3/1995 | Baker et al. |
| 5,404,181 A | 4/1995 | Hung |
| 5,426,732 A | 6/1995 | Boies et al. |
| 5,448,405 A | 9/1995 | Clausen et al. |
| 5,464,957 A | 11/1995 | Kidwell et al. |
| 5,508,757 A | 4/1996 | Chen |
| 5,514,846 A | 5/1996 | Cecil et al. |
| 5,517,420 A | 5/1996 | Kinsman et al. |
| 5,521,843 A | 5/1996 | Hashima et al. |
| 5,533,146 A | 7/1996 | Iwai |
| 5,543,863 A | 8/1996 | Lin |
| 5,546,476 A | 8/1996 | Mitaka et al. |
| 5,571,431 A | 11/1996 | Antieri et al. |
| 5,592,241 A | 1/1997 | Kita et al. |
| 5,617,335 A | 4/1997 | Hashima et al. |
| 5,659,479 A | 8/1997 | Duley et al. |
| 5,668,612 A | 9/1997 | Hung |
| 5,674,415 A | 10/1997 | Leong et al. |
| 5,675,229 A | 10/1997 | Thorne |
| 5,681,490 A | 10/1997 | Chang |
| 5,708,253 A | 1/1998 | Bloch et al. |
| 5,709,219 A | 1/1998 | Chen et al. |
| 5,747,042 A | 5/1998 | Choquet |
| 5,823,785 A | 10/1998 | Matherne, Jr. |
| 5,832,139 A | 11/1998 | Batterman et al. |
| 5,845,053 A | 12/1998 | Watanabe et al. |
| 5,856,844 A | 1/1999 | Batterman et al. |
| 5,930,093 A | 7/1999 | Morrissett |
| 5,961,859 A | 10/1999 | Chou et al. |
| 5,973,677 A | 10/1999 | Gibbons |
| 5,999,909 A | 12/1999 | Rakshit et al. |
| 6,003,052 A | 12/1999 | Yamagata |
| 6,018,729 A | 1/2000 | Zacharia et al. |
| 6,019,359 A | 2/2000 | Fly |
| 6,024,273 A | 2/2000 | Udewig et al. |
| 6,033,226 A | 3/2000 | Bullen |
| 6,039,494 A | 3/2000 | Pearce |
| 6,046,754 A | 4/2000 | Stanek |
| 6,049,059 A | 4/2000 | Kim |
| 6,051,805 A | 4/2000 | Vaidya et al. |
| 6,101,455 A | 8/2000 | Davis |
| 6,103,994 A * | 8/2000 | DeCoster ............. B23K 9/1087 219/132 |
| 6,107,601 A | 8/2000 | Shimogama |
| 6,130,407 A | 10/2000 | Villafuerte |
| 6,136,946 A | 10/2000 | Yao et al. |
| 6,153,848 A | 11/2000 | Nagae et al. |
| 6,155,475 A | 12/2000 | Ekelof et al. |
| 6,163,946 A | 12/2000 | Pryor |
| 6,226,395 B1 | 5/2001 | Gilliland |
| 6,236,017 B1 | 5/2001 | Smartt et al. |
| 6,242,711 B1 | 6/2001 | Cooper |
| 6,271,500 B1 | 8/2001 | Hirayama et al. |
| 6,288,359 B1 | 9/2001 | Koch et al. |
| 6,290,740 B1 | 9/2001 | Schaefer |
| 6,301,763 B1 | 10/2001 | Pryor |
| 6,315,186 B1 | 11/2001 | Friedl et al. |
| 6,329,635 B1 | 12/2001 | Leong et al. |
| 6,337,458 B1 | 1/2002 | Lepeltier |
| 6,371,765 B1 | 4/2002 | Wall et al. |
| 6,417,894 B1 | 7/2002 | Goff et al. |
| 6,420,680 B1 | 7/2002 | Samodell |
| 6,441,342 B1 | 8/2002 | Hsu |
| 6,445,964 B1 | 9/2002 | White et al. |
| 6,469,752 B1 | 10/2002 | Ishikawa et al. |
| 6,476,354 B1 | 11/2002 | Jank et al. |
| 6,479,793 B1 | 11/2002 | Wittmann et al. |
| 6,506,997 B2 | 1/2003 | Matsuyama |
| 6,516,300 B1 | 2/2003 | Rakshit et al. |
| 6,572,379 B1 | 6/2003 | Sears et al. |
| 6,583,386 B1 | 6/2003 | Ivkovich |
| 6,596,972 B1 | 7/2003 | Di Novo et al. |
| 6,614,002 B2 | 9/2003 | Weber |

(56) References Cited

U.S. PATENT DOCUMENTS

| | | |
|---|---|---|
| 6,621,049 B2 | 9/2003 | Suzuki |
| 6,622,906 B1 | 9/2003 | Kushibe |
| 6,647,288 B2 | 11/2003 | Madill et al. |
| 6,670,574 B1 | 12/2003 | Bates et al. |
| 6,697,761 B2 | 2/2004 | Akatsuka et al. |
| 6,703,585 B2 | 3/2004 | Suzuki |
| 6,710,298 B2 | 3/2004 | Eriksson |
| 6,728,582 B1 | 4/2004 | Wallack |
| 6,734,393 B1 | 5/2004 | Friedl et al. |
| 6,744,011 B1 | 6/2004 | Hu et al. |
| 6,748,249 B1 | 6/2004 | Eromaki et al. |
| 6,750,427 B1 | 6/2004 | DeCoster |
| 6,750,428 B2 | 6/2004 | Okamoto et al. |
| 6,753,909 B1 | 6/2004 | Westerman et al. |
| 6,768,974 B1 | 7/2004 | Nanjundan et al. |
| 6,795,068 B1 | 9/2004 | Marks |
| 6,839,049 B1 | 1/2005 | Koizumi |
| 6,857,553 B1 | 2/2005 | Hartman et al. |
| 6,868,726 B2 | 3/2005 | Lemkin et al. |
| 6,910,971 B2 | 6/2005 | Alsenz |
| 6,927,360 B2 | 8/2005 | Artelsmair et al. |
| 6,937,329 B2 | 8/2005 | Esmiller |
| 6,967,635 B2 | 11/2005 | Hung |
| 6,977,357 B2 | 12/2005 | Hsu et al. |
| 6,995,536 B2 | 2/2006 | Challoner |
| 7,015,419 B2 | 3/2006 | Hackl et al. |
| 7,025,053 B1 | 4/2006 | Altamirano |
| 7,032,814 B2 | 4/2006 | Blankenship |
| 7,045,742 B2 | 5/2006 | Feichtinger et al. |
| 7,081,888 B2 | 7/2006 | Cok et al. |
| 7,120,473 B1 | 10/2006 | Hawkins et al. |
| 7,132,617 B2 | 11/2006 | Lee et al. |
| 7,132,623 B2 | 11/2006 | De Miranda et al. |
| 7,150,047 B2 | 12/2006 | Fergason |
| 7,173,215 B1 | 2/2007 | Kapoor et al. |
| 7,181,413 B2 | 2/2007 | Hadden et al. |
| 7,226,176 B1 | 6/2007 | Huang |
| 7,261,261 B2 | 8/2007 | Ligertwood |
| 7,342,210 B2 | 3/2008 | Fergason |
| 7,358,458 B2 | 4/2008 | Daniel |
| 7,465,230 B2 | 12/2008 | LeMay et al. |
| 7,474,760 B2 | 1/2009 | Hertzman et al. |
| 7,523,069 B1 | 4/2009 | Friedl et al. |
| 7,564,005 B2 | 7/2009 | Cabanaw et al. |
| 7,574,172 B2 | 8/2009 | Clark et al. |
| 7,577,285 B2 | 8/2009 | Schwarz et al. |
| D614,217 S | 4/2010 | Peters et al. |
| 7,698,094 B2 | 4/2010 | Aratani et al. |
| D615,573 S | 5/2010 | Peters et al. |
| 7,766,213 B2 | 8/2010 | Henrikson |
| 7,789,811 B2 | 9/2010 | Cooper |
| 7,826,984 B2 | 11/2010 | Sjostrand et al. |
| 7,831,098 B2 | 11/2010 | Melikian |
| 7,839,416 B2 | 11/2010 | Ebensberger et al. |
| 7,845,560 B2 | 12/2010 | Emanuel et al. |
| D631,074 S | 1/2011 | Peters et al. |
| 7,899,618 B2 | 3/2011 | Ledet et al. |
| 7,962,967 B2 | 6/2011 | Becker et al. |
| 8,019,144 B2 | 9/2011 | Sugihara |
| 8,044,942 B1 | 10/2011 | Leonhard et al. |
| 8,046,178 B2 | 10/2011 | Dai et al. |
| 8,100,694 B2 | 1/2012 | Portoghese et al. |
| 8,110,774 B2 | 2/2012 | Huonker et al. |
| 8,235,588 B2 | 8/2012 | Louban et al. |
| 8,248,324 B2 | 8/2012 | Nangle |
| 8,274,013 B2 | 9/2012 | Wallace et al. |
| 8,393,519 B2 | 3/2013 | Allehaux et al. |
| 8,406,682 B2 | 3/2013 | Elesseily et al. |
| 8,431,862 B2 | 4/2013 | Kachline |
| 8,432,476 B2 | 4/2013 | Ashforth et al. |
| 8,502,866 B2 | 8/2013 | Becker et al. |
| 8,512,043 B2 | 8/2013 | Choquet |
| 8,541,746 B2 | 9/2013 | Andres et al. |
| 8,657,605 B2 | 2/2014 | Wallace et al. |
| 8,681,178 B1 | 3/2014 | Tseng |
| 8,692,157 B2 | 4/2014 | Daniel et al. |
| 8,698,843 B2 | 4/2014 | Tseng |
| 8,747,116 B2 | 6/2014 | Zboray et al. |
| 8,777,629 B2 | 7/2014 | Kreindl et al. |
| 8,803,908 B2 | 8/2014 | Van Osten et al. |
| 8,834,168 B2 | 9/2014 | Peters et al. |
| 8,851,896 B2 | 10/2014 | Wallace et al. |
| 8,860,760 B2 | 10/2014 | Chen et al. |
| 8,911,237 B2 | 12/2014 | Postlethwaite et al. |
| 8,915,740 B2 | 12/2014 | Zboray et al. |
| 8,946,595 B2 | 2/2015 | Ishida et al. |
| 8,953,033 B2 | 2/2015 | Yamane et al. |
| 8,953,909 B2 | 2/2015 | Guckenberger et al. |
| RE45,398 E | 3/2015 | Wallace |
| 8,987,628 B2 | 3/2015 | Daniel et al. |
| 8,990,842 B2 | 3/2015 | Rowley et al. |
| 8,992,226 B1 | 3/2015 | Leach et al. |
| 9,011,154 B2 | 4/2015 | Kindig et al. |
| 9,012,802 B2 | 4/2015 | Daniel et al. |
| 9,050,678 B2 | 6/2015 | Daniel et al. |
| 9,050,679 B2 | 6/2015 | Daniel et al. |
| 9,089,921 B2 | 7/2015 | Daniel et al. |
| 9,101,994 B2 | 8/2015 | Albrecht |
| 9,196,169 B2 | 11/2015 | Wallace et al. |
| 9,218,745 B2 | 12/2015 | Choquet |
| 9,230,449 B2 | 1/2016 | Conrardy et al. |
| 9,269,279 B2 | 2/2016 | Penrod et al. |
| 9,293,056 B2 | 3/2016 | Zboray et al. |
| 9,293,057 B2 | 3/2016 | Zboray et al. |
| 9,318,026 B2 | 4/2016 | Peters et al. |
| 9,330,575 B2 | 5/2016 | Peters et al. |
| 9,336,686 B2 | 5/2016 | Peters et al. |
| 9,368,045 B2 | 6/2016 | Becker |
| 9,402,122 B2 | 7/2016 | Richardson et al. |
| 9,573,215 B2 | 2/2017 | Pfeifer et al. |
| 9,928,755 B2 * | 3/2018 | Wallace ............... G09B 19/24 |
| 2001/0026445 A1 | 10/2001 | Naghi et al. |
| 2001/0032508 A1 | 10/2001 | Lemkin et al. |
| 2002/0043607 A1 | 4/2002 | Tajima |
| 2002/0071550 A1 | 6/2002 | Pletikosa |
| 2002/0105797 A1 | 8/2002 | Navid et al. |
| 2002/0114653 A1 | 8/2002 | Gatta |
| 2002/0148745 A1 | 10/2002 | Chang |
| 2002/0153354 A1 | 10/2002 | Norby et al. |
| 2003/0011673 A1 | 1/2003 | Eriksson |
| 2003/0015510 A1 | 1/2003 | Wakeman |
| 2003/0092496 A1 | 5/2003 | Alsenz |
| 2003/0172032 A1 | 9/2003 | Choquet |
| 2004/0058703 A1 | 3/2004 | Eromaki et al. |
| 2004/0068335 A1 | 4/2004 | Ferla et al. |
| 2004/0069754 A1 | 4/2004 | Bates et al. |
| 2004/0099648 A1 | 5/2004 | Hu et al. |
| 2004/0175684 A1 | 9/2004 | Kaasa et al. |
| 2004/0223148 A1 | 11/2004 | Takemura |
| 2004/0227730 A1 | 11/2004 | Sugihara |
| 2004/0251910 A1 | 12/2004 | Smith |
| 2005/0006363 A1 | 1/2005 | Hsu et al. |
| 2005/0012598 A1 | 1/2005 | Berquist |
| 2005/0016979 A1 | 1/2005 | Stein et al. |
| 2005/0017152 A1 | 1/2005 | Fergason |
| 2005/0073506 A1 | 4/2005 | Durso |
| 2005/0127052 A1 | 6/2005 | Spencer |
| 2005/0133488 A1 | 6/2005 | Blankenship |
| 2005/0135682 A1 | 6/2005 | Abrams et al. |
| 2005/0179654 A1 | 8/2005 | Hawkins et al. |
| 2005/0197115 A1 | 9/2005 | Clark et al. |
| 2005/0207102 A1 | 9/2005 | Russo |
| 2005/0227635 A1 | 10/2005 | Hawkins et al. |
| 2005/0256611 A1 | 11/2005 | Pretlove et al. |
| 2006/0010551 A1 | 1/2006 | Bishop et al. |
| 2006/0081740 A1 | 4/2006 | Bellavance |
| 2006/0136183 A1 | 6/2006 | Choquet |
| 2006/0138113 A1 | 6/2006 | Ott |
| 2006/0151446 A1 | 7/2006 | Schneider |
| 2006/0163228 A1 | 7/2006 | Daniel |
| 2006/0173619 A1 | 8/2006 | Brant et al. |
| 2006/0212169 A1 | 9/2006 | Luthardt |
| 2006/0241432 A1 | 10/2006 | Herline et al. |
| 2007/0038400 A1 | 2/2007 | Lee et al. |

(56) References Cited

U.S. PATENT DOCUMENTS

| | | |
|---|---|---|
| 2007/0051711 A1 | 3/2007 | Kachline |
| 2007/0114215 A1 | 5/2007 | Bill |
| 2007/0115202 A1 | 5/2007 | Kiesenhofer |
| 2007/0164006 A1 | 7/2007 | Burgstaller et al. |
| 2007/0187378 A1 | 8/2007 | Karakas |
| 2007/0188606 A1 | 8/2007 | Atkinson et al. |
| 2007/0221636 A1 | 9/2007 | Monzyk |
| 2007/0247793 A1 | 10/2007 | Carnevali |
| 2007/0248261 A1 | 10/2007 | Zhou et al. |
| 2007/0264620 A1 | 11/2007 | Maddix et al. |
| 2007/0278196 A1 | 12/2007 | James et al. |
| 2007/0291166 A1 | 12/2007 | Misawa |
| 2008/0030631 A1 | 2/2008 | Gallagher |
| 2008/0038702 A1 | 2/2008 | Choquet |
| 2008/0061113 A9 | 3/2008 | Seki et al. |
| 2008/0077422 A1 | 3/2008 | Dooley et al. |
| 2008/0124698 A1 | 5/2008 | Ebensberger et al. |
| 2008/0128395 A1 | 6/2008 | Aigner et al. |
| 2008/0149602 A1 | 6/2008 | Lenzner et al. |
| 2008/0149608 A1 | 6/2008 | Albrecht |
| 2008/0158502 A1 | 7/2008 | Becker et al. |
| 2008/0168290 A1 | 7/2008 | Jobs et al. |
| 2008/0169277 A1 | 7/2008 | Achtner et al. |
| 2008/0234960 A1 | 9/2008 | Byington et al. |
| 2008/0314887 A1 | 12/2008 | Stoger et al. |
| 2009/0005728 A1 | 1/2009 | Weinert et al. |
| 2009/0057285 A1 | 3/2009 | Bashore et al. |
| 2009/0057286 A1 | 3/2009 | Ihara et al. |
| 2009/0109128 A1 | 4/2009 | Nangle |
| 2009/0146359 A1 | 6/2009 | Canfield et al. |
| 2009/0152251 A1 | 6/2009 | Dantinne et al. |
| 2009/0161212 A1 | 6/2009 | Gough |
| 2009/0173726 A1 | 7/2009 | Davidson et al. |
| 2009/0189974 A1 | 7/2009 | Deering et al. |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker et al. |
| 2009/0236325 A1 | 9/2009 | Gozalbo |
| 2009/0249606 A1 | 10/2009 | Diez et al. |
| 2009/0283021 A1 | 11/2009 | Wong |
| 2009/0298024 A1 | 12/2009 | Batzler et al. |
| 2009/0313549 A1 | 12/2009 | Casner et al. |
| 2009/0323121 A1 | 12/2009 | Valkenburg et al. |
| 2010/0020483 A1 | 1/2010 | Ma |
| 2010/0044348 A1 | 2/2010 | Buchmann |
| 2010/0048273 A1 | 2/2010 | Wallace et al. |
| 2010/0062405 A1 | 3/2010 | Zboray et al. |
| 2010/0062406 A1 | 3/2010 | Zboray et al. |
| 2010/0088793 A1 | 4/2010 | Ghisleni et al. |
| 2010/0108654 A1 | 5/2010 | Ulrich et al. |
| 2010/0123664 A1 | 5/2010 | Shin et al. |
| 2010/0133247 A1 | 6/2010 | Mazumder et al. |
| 2010/0145520 A1 | 6/2010 | Gerio et al. |
| 2010/0201803 A1 | 8/2010 | Melikian |
| 2010/0207620 A1 | 8/2010 | Gies |
| 2010/0224610 A1 | 9/2010 | Wallace |
| 2010/0238119 A1 | 9/2010 | Dubrovsky et al. |
| 2010/0245273 A1 | 9/2010 | Hwang et al. |
| 2010/0283588 A1 | 11/2010 | Gomez et al. |
| 2010/0291313 A1 | 11/2010 | Ling |
| 2010/0314362 A1 | 12/2010 | Albrecht |
| 2011/0000892 A1 | 1/2011 | Mueller et al. |
| 2011/0006047 A1 | 1/2011 | Penrod et al. |
| 2011/0091846 A1 | 4/2011 | Kreindl et al. |
| 2011/0092828 A1 | 4/2011 | Spohn et al. |
| 2011/0114615 A1 | 5/2011 | Daniel et al. |
| 2011/0117527 A1 | 5/2011 | Conrardy et al. |
| 2011/0176720 A1 | 7/2011 | Van Osten et al. |
| 2011/0183304 A1 | 7/2011 | Wallace et al. |
| 2011/0198329 A1 | 8/2011 | Davidson et al. |
| 2011/0220616 A1 | 9/2011 | Mehn et al. |
| 2011/0220619 A1 | 9/2011 | Mehn |
| 2011/0240605 A1 | 10/2011 | Takayama et al. |
| 2011/0249090 A1 | 10/2011 | Moore et al. |
| 2011/0284508 A1 | 11/2011 | Miura et al. |
| 2011/0285290 A1 | 11/2011 | Griffin et al. |
| 2011/0286005 A1 | 11/2011 | Yamamoto et al. |
| 2011/0290765 A1 | 12/2011 | Albrecht et al. |
| 2011/0313731 A1 | 12/2011 | Vock et al. |
| 2012/0007748 A1 | 1/2012 | Forgues et al. |
| 2012/0037600 A1 | 2/2012 | Katoh et al. |
| 2012/0048838 A1 | 3/2012 | Ishida et al. |
| 2012/0072021 A1 | 3/2012 | Walser et al. |
| 2012/0077174 A1 | 3/2012 | DePaul |
| 2012/0105476 A1 | 5/2012 | Tseng |
| 2012/0113512 A1 | 5/2012 | Tsanev et al. |
| 2012/0122062 A1 | 5/2012 | Yang et al. |
| 2012/0175834 A1 | 7/2012 | Hamm et al. |
| 2012/0180180 A1 | 7/2012 | Steve |
| 2012/0188365 A1 | 7/2012 | Stork |
| 2012/0189993 A1 | 7/2012 | Kindig et al. |
| 2012/0205359 A1 | 8/2012 | Daniel |
| 2012/0231894 A1 | 9/2012 | Nicora |
| 2012/0248080 A1 | 10/2012 | Hutchison et al. |
| 2012/0248083 A1 | 10/2012 | Garvey et al. |
| 2012/0291172 A1 | 11/2012 | Wills et al. |
| 2012/0298640 A1 | 11/2012 | Conrardy et al. |
| 2012/0323496 A1 | 12/2012 | Burroughs et al. |
| 2013/0040270 A1 | 2/2013 | Albrecht |
| 2013/0064427 A1 | 3/2013 | Picard et al. |
| 2013/0081293 A1 | 4/2013 | Delin et al. |
| 2013/0119037 A1 | 5/2013 | Daniel |
| 2013/0119041 A1 | 5/2013 | Humenik |
| 2013/0178952 A1 | 7/2013 | Wersborg et al. |
| 2013/0182070 A1 | 7/2013 | Peters et al. |
| 2013/0183645 A1 | 7/2013 | Wallace et al. |
| 2013/0189656 A1 | 7/2013 | Zboray et al. |
| 2013/0189657 A1 | 7/2013 | Wallace et al. |
| 2013/0189658 A1 | 7/2013 | Peters et al. |
| 2013/0200882 A1 | 8/2013 | Almalki et al. |
| 2013/0203029 A1 | 8/2013 | Choquet |
| 2013/0206741 A1 | 8/2013 | Pfeifer et al. |
| 2013/0209976 A1* | 8/2013 | Postlethwaite ......... G09B 19/24 434/234 |
| 2013/0230832 A1* | 9/2013 | Peters ...................... G09B 5/02 434/234 |
| 2013/0252214 A1 | 9/2013 | Choquet |
| 2013/0256289 A1 | 10/2013 | Knoener et al. |
| 2013/0262000 A1 | 10/2013 | Hutchison et al. |
| 2013/0264315 A1 | 10/2013 | Hung et al. |
| 2013/0264322 A1 | 10/2013 | Bornemann et al. |
| 2013/0265416 A1 | 10/2013 | Enyedy et al. |
| 2013/0288211 A1 | 10/2013 | Patterson et al. |
| 2013/0319987 A1 | 12/2013 | Beistle et al. |
| 2013/0326842 A1 | 12/2013 | Pearson et al. |
| 2014/0008088 A1 | 1/2014 | Chellew |
| 2014/0017642 A1 | 1/2014 | Postlethwaite et al. |
| 2014/0039520 A1 | 2/2014 | Haider et al. |
| 2014/0042135 A1 | 2/2014 | Daniel et al. |
| 2014/0042137 A1 | 2/2014 | Daniel et al. |
| 2014/0065584 A1 | 3/2014 | Wallace et al. |
| 2014/0069899 A1 | 3/2014 | Mehn et al. |
| 2014/0131337 A1 | 5/2014 | Williams |
| 2014/0134579 A1 | 5/2014 | Becker et al. |
| 2014/0134580 A1 | 5/2014 | Becker |
| 2014/0184496 A1 | 7/2014 | Gribetz et al. |
| 2014/0220522 A1 | 8/2014 | Peters et al. |
| 2014/0234813 A1 | 8/2014 | Peters et al. |
| 2014/0263224 A1 | 9/2014 | Becker |
| 2014/0263227 A1 | 9/2014 | Daniel et al. |
| 2014/0267773 A1 | 9/2014 | Jeung et al. |
| 2014/0272835 A1 | 9/2014 | Becker |
| 2014/0272836 A1 | 9/2014 | Becker |
| 2014/0272837 A1 | 9/2014 | Becker |
| 2014/0272838 A1* | 9/2014 | Becker ................... B23K 37/04 434/234 |
| 2014/0315167 A1 | 10/2014 | Kreindl et al. |
| 2014/0322684 A1 | 10/2014 | Wallace et al. |
| 2014/0346158 A1 | 11/2014 | Matthews |
| 2014/0346163 A1 | 11/2014 | Rajagopalan et al. |
| 2014/0346793 A1 | 11/2014 | DeStories et al. |
| 2014/0374396 A1 | 12/2014 | Luo et al. |
| 2015/0056584 A1 | 2/2015 | Boulware et al. |

(56) References Cited

U.S. PATENT DOCUMENTS

| | | |
|---|---|---|
| 2015/0056585 A1 | 2/2015 | Boulware et al. |
| 2015/0072323 A1 | 3/2015 | Postlethwaite et al. |
| 2015/0122781 A1 | 5/2015 | Albrecht |
| 2015/0154884 A1* | 6/2015 | Salsich ............. B23K 9/0953 434/234 |
| 2015/0170539 A1 | 6/2015 | Barrera et al. |
| 2015/0190875 A1 | 7/2015 | Becker et al. |
| 2015/0190876 A1 | 7/2015 | Becker et al. |
| 2015/0190887 A1 | 7/2015 | Becker et al. |
| 2015/0190888 A1 | 7/2015 | Becker et al. |
| 2015/0194072 A1 | 7/2015 | Becker et al. |
| 2015/0194073 A1 | 7/2015 | Becker et al. |
| 2015/0209887 A1 | 7/2015 | DeLisio |
| 2015/0235565 A1 | 8/2015 | Postlethwaite et al. |
| 2015/0248845 A1 | 9/2015 | Postlethwaite et al. |
| 2015/0325153 A1 | 11/2015 | Albrecht |
| 2015/0328710 A1 | 11/2015 | Kachline |
| 2015/0352653 A1 | 12/2015 | Albrecht et al. |
| 2015/0375323 A1 | 12/2015 | Becker |
| 2015/0375324 A1 | 12/2015 | Becker |
| 2015/0375327 A1 | 12/2015 | Becker et al. |
| 2015/0379894 A1 | 12/2015 | Becker et al. |
| 2016/0039034 A1 | 2/2016 | Becker et al. |
| 2016/0039053 A1 | 2/2016 | Becker et al. |
| 2016/0049085 A1 | 2/2016 | Beeson |
| 2016/0093233 A1 | 3/2016 | Boulware |
| 2016/0125592 A1 | 5/2016 | Becker et al. |
| 2016/0125593 A1 | 5/2016 | Becker et al. |
| 2016/0125594 A1 | 5/2016 | Becker et al. |
| 2016/0125653 A1 | 5/2016 | Denis |
| 2016/0125761 A1 | 5/2016 | Becker et al. |
| 2016/0125762 A1 | 5/2016 | Becker et al. |
| 2016/0125763 A1 | 5/2016 | Becker |
| 2016/0125764 A1 | 5/2016 | Becker |
| 2016/0193679 A1 | 7/2016 | Zhang et al. |
| 2016/0203734 A1 | 7/2016 | Boulware et al. |
| 2016/0203735 A1 | 7/2016 | Boulware et al. |
| 2016/0236303 A1 | 8/2016 | Matthews et al. |
| 2016/0260261 A1 | 9/2016 | Hsu |
| 2016/0267806 A1 | 9/2016 | Hsu et al. |
| 2016/0288236 A1 | 10/2016 | Becker |
| 2016/0358503 A1 | 12/2016 | Batzler et al. |
| 2017/0036288 A1* | 2/2017 | Albrecht ............. B23K 31/125 |
| 2017/0046974 A1* | 2/2017 | Becker ............... G09B 19/003 |
| 2017/0046975 A1 | 2/2017 | Becker et al. |
| 2017/0046976 A1 | 2/2017 | Becker et al. |
| 2017/0046977 A1 | 2/2017 | Becker et al. |
| 2017/0148352 A1 | 5/2017 | Becker |
| 2017/0165776 A1 | 6/2017 | Becker et al. |
| 2017/0169729 A1 | 6/2017 | Becker et al. |
| 2018/0130377 A1* | 5/2018 | Meess ............... B23K 9/1093 |

FOREIGN PATENT DOCUMENTS

| | | |
|---|---|---|
| CA | 2549553 | 7/2004 |
| CA | 2554498 | 4/2006 |
| CN | 1866317 | 11/2006 |
| CN | 201181527 | 1/2009 |
| CN | 102049595 | 5/2011 |
| CN | 202200202 | 4/2012 |
| CN | 202877704 | 4/2013 |
| DE | 202010011064 | 10/2010 |
| DE | 202011000134 | 3/2011 |
| DE | 102010038902 | 2/2012 |
| EP | 0323277 | 7/1989 |
| EP | 0878263 | 11/1998 |
| EP | 0963744 | 12/1999 |
| EP | 1029306 | 8/2000 |
| EP | 1295195 | 6/2001 |
| EP | 1573699 | 9/2005 |
| EP | 1797545 | 6/2007 |
| EP | 1864744 | 12/2007 |
| EP | 2415560 | 2/2014 |
| EP | 3318360 | 5/2018 |
| ES | 2438440 | 1/2014 |
| FR | 1456780 | 7/1966 |
| FR | 2827066 | 1/2003 |
| GB | 2454232 A | 5/2009 |
| JP | H11146387 | 5/1999 |
| JP | 2000298427 | 10/2000 |
| JP | 2004181493 | 7/2004 |
| JP | 2007021542 | 2/2007 |
| JP | 2009125790 | 6/2009 |
| KR | 100876425 | 12/2008 |
| SU | 972552 | 11/1982 |
| SU | 1354234 | 11/1987 |
| SU | 1489933 | 6/1989 |
| SU | 1638145 | 3/1991 |
| WO | 9958286 | 11/1999 |
| WO | 03019349 | 1/2003 |
| WO | 2004057554 | 7/2004 |
| WO | 2005102230 | 11/2005 |
| WO | 2005110658 | 11/2005 |
| WO | 2006004427 | 1/2006 |
| WO | 2006034571 | 4/2006 |
| WO | 2007009131 | 1/2007 |
| WO | 2007044135 | 4/2007 |
| WO | 2008076777 | 6/2008 |
| WO | 2009022443 | 2/2009 |
| WO | 2009053829 | 4/2009 |
| WO | 2009060231 | 5/2009 |
| WO | 2009092944 | 7/2009 |
| WO | 2009146359 | 12/2009 |
| WO | 2010000003 | 1/2010 |
| WO | 2010020867 | 2/2010 |
| WO | 2010020869 | 2/2010 |
| WO | 2010020870 | 2/2010 |
| WO | 2010111722 | 10/2010 |
| WO | 2011112493 | 9/2011 |
| WO | 2011150165 | 12/2011 |
| WO | 2012036710 | 3/2012 |
| WO | 2012137060 | 10/2012 |
| WO | 2013023012 | 2/2013 |
| WO | 2013138831 | 9/2013 |
| WO | 2014007830 | 1/2014 |
| WO | 2014074296 | 5/2014 |
| WO | 2014140719 | 9/2014 |

OTHER PUBLICATIONS http://www.123arc.com "Simulation and Certification"; 2000.
Image from Sim Welder.com—R-V's Welder Training Goes Virtual, www.rvii.com/PDF/simwelder.pdf; Jan. 2010.
IMPACT Spring 2012 vol. 12, No. 2, Undergraduate Research in Information Technology Engineering, University of Virginia School of Engineering & Applied Science; 2012.
Impact Welding: miscellaneous examples from current and archived website, trade shows, etc. See, e.g., http://www.impactwelding.com.
Integrated Microelectromechanical Gyroscopes; Journal of Aerospace Engineering, Apr. 2003 pp. 65-75 (p. 65) by Huikai Xie and Garry K. Fedder.
International Search Report for PCT application No. PCT/US2009/045436, dated Nov. 9, 2009, 3 pgs.
International Search Report for PCT application No. PCT/US2012/050059, dated Nov. 27, 2012, 16 pgs.
International Search Report for PCT application No. PCT/US2013/038371, dated Jul. 31, 2013, 8 pgs.
International Search Report for PCT application No. PCT/US2013/066037, dated Mar. 11, 2014, 10 pgs.
International Search Report for PCT application No. PCT/US2013/066040, dated Mar. 11, 2014, 12 pgs.
International Search Report for PCT application No. PCT/US2014/018107, dated Jun. 2, 2014, 3 pgs.
International Search Report for PCT application No. PCT/US2014/018109, dated Jun. 2, 2014, 4 pgs.
International Search Report for PCT application No. PCT/US2014/018113, dated Jun. 2, 2014, 3pgs.
International Search Report for PCT application No. PCT/US2014/018114, dated Jun. 2, 2014, 4 pgs.

(56) References Cited

OTHER PUBLICATIONS

International Search Report for PCT application No. PCT/US2014/065498, dated May 11, 2015, 13 pgs.
International Search Report for PCT application No. PCT/US2014/065506, dated Jun. 26, 2015, 16 pgs.
International Search Report for PCT application No. PCT/US2014/065512, dated Jun. 8, 2015, 17 pgs.
International Search Report for PCT application No. PCT/US2014/065525, dated Jul. 23, 2015, 16 pgs.
International Search Report for PCT application No. PCT/US2014/067951, dated Feb. 24, 2015, 10 pgs.
International Search Report for PCT application No. PCT/US2015/037410, dated Nov. 6, 2015, 10 pgs.
International Search Report for PCT application No. PCT/US2015/037439, dated Nov. 3, 2015, 12 pgs.
International Search Report for PCT application No. PCT/US2015/037440, dated Nov. 3, 2015, 12 pgs.
International Search Report for PCT application No. PCT/US2015/039680, dated Sep. 23, 2015, 12 pgs.
International Search Report from PCT application No. PCT/US2014/018103, dated Jun. 30, 2014, 13 pgs.
International Search Report from PCT application No. PCT/US2015/043370, dated Dec. 4, 2015, 12 pgs.
International Search Report from PCT application No. PCT/US2015/058563, dated Jan. 29, 2016, 13 pgs.
International Search Report from PCT application No. PCT/US2015/058567, dated May 6, 2016, 15 pgs.
International Search Report from PCT application No. PCT/US2015/058569, dated Feb. 10, 2016, 12 pgs.
International Search Report from PCT application No. PCT/US2015/058660, dated Feb. 2, 2016, 14 pgs.
International Search Report from PCT application No. PCT/US2015/058664, dated Apr. 25, 2016, 17 pgs.
International Search Report from PCT application No. PCT/US2015/058666, dated Feb. 1, 2016, 11 pgs.
International Search Report from PCT application No. PCT/US2015/058667, dated Feb. 5, 2016, 14 pgs.
International Search Report from PCT application No. PCT/US2016/023612, dated Jul. 18, 2016, 11 pgs.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09/0011.
Kiwinakiful; Holographic TV coming 2012 (as seen on BBC); http://www.youtube.com/watch?v=Ux6aD6vE9sk&feature=related, Jul. 2, 2011.
Kobayashi, Kazuhiko et al., "Modified Training System for Manual Arc Welding by Using Mixed Reality and Investigation of Its Effectiveness," Journal of the Japan Society for Precision Engineering, vol. 70, pp. 941-945, 2004.
Kobayashi, Kazuhiko et al., "Simulator of Manual Metal Arc Welding with Haptic Display," Chiba University, ICAT 2001, Dec. 2001.
Kobayashi, Kazuhiko et al., "Skill Training System of Manual Arc Welding by Means of Face-Shield HMD and Virtual Electrode," Chiba University, Japan, R. Nakatsu et al. (eds.), Entertainment Computing, Springer Science+Business Media, New York, 2003.
Kooima, Robert; Kinect +3D TV=Virtual Reality; http://www.youtube.com/watch?v=2MX1RinEXUM&feature=related, Feb. 26, 2011.
Leap Motion; https://www.leapmotion.com/, May 2012.
Lincoln Electric VRTEX Virtual Reality Arc Welding Trainer; http://www.lincolnelectric.com/en-us/equipment/training-equipment/pages/vrtex360.aspx; 1999.
MacCormick, John; How does the Kinect work ?; http://users.dickinson.edu/~jmac/selected-talks/kinect.pdf, Dec. 1, 2011.
NAMeS Users Guide, N A Tech Neural Applications, Copyright 1997, 1998, 1999, 2000 Golden, CO (123 pages).
NAMeS, Native American Technologies Weld Measuring Software, Users Guide, 2000.

National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetail.action?pid . . .
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "Process Improvement Products" web page, http://web.archive.org/web/20020608050736/http://www.natech-inc.com/products.html, published Jun. 8, 2002.
"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.
"NJC Technology Displayed at ShipTech 2005", Welding Journal, vol. 84, No. 3, Mar. 2005, p. 54, https://app.aws.org/w/r/www/wj/2005/03/WJ_2005_03.pdf.
"Sheet Metal Conference XXII," Conference Program, American Welding Society, May 2006, Detroit.
"SOLDAMATIC: Augmented Training Technology for Welding," Seabery Augmented Training Technology, Seabery Soluciones, 2011.
"Virtual Reality Program to Train Welders for Shipbuilding", American Welding Society, Navy Joining Center, https://app.aws.org/wj/2004/04/052/.
"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.
"Virtual Welding—A Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.
"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.
"Vision for Welding Industry," American Welding Society, Apr. 22, 1999, http://www.aws.org/library/doclib/vision.pdf.
"Welding in Defense Industry," American Welding Society conference schedule, 2004. https://app.aws.org/conferences/defense/live_index.html.
"Welding Technology Roadmap," prepared by Energetics, Inc., Columbia, MD, in cooperation with The American Welding Society and The Edison Welding Institute, Sep. 2000.
123arc.com—"Weld into the future"; 2000.
Advance Program of American Welding Society Programs and Events, Nov. 11-14, 2007, Chicago.
Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.
Aiteanu, Dorin, et al., "A Step Forward in Manual Welding: Demonstration of Augmented Reality Helmet," Institute of Automation, University of Bremen, Germany, 2003.
Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).
American Welding Society Forms: typical Procedure Qualification Record and Welding Procedure Specification forms.

(56) References Cited

OTHER PUBLICATIONS

American Welding Society's Virtual Welding Trailer to Debut at FABTECH Careers in Welding Trailer Appeals to New Generation of Welders, Miami, Florida, Nov. 3, 2011.
ArcSentry Weld Monitoring System, Version 3, Users Manual, Native American Technologies, Golden, CO, Dec. 10, 1999.
ARVIKA Forum Vorstellung Projeckt PAARA, BMW Group Virtual Reality Center, Nuernberg, 2003.
Ascension Technology Corporation: Tracking 3D Worlds: http://ascension-tech.com/, Dec. 1996.
Barckhoff, J.R .; "Total Welding Managemet," American Welding Society, 2005.
Bender Shipbuilding and Repair, Co., "Virtual Welding—A Low Cost Virtual Reality Welder Training System", Technical Proposal, Jan. 23, 2008.
Byrd, Alex Preston, "Identifying the effects of human factors and training methods on a weld training program" (2014). Graduate Theses and Dissertations. Paper 13991.
Central Welding Supply http://www.welders-direct.com/ Feb. 29, 2000.
Choquet, Claude, ARC+ & ARC PC Welding Simulators: Teach Welders with Virtual Interactive 3D Technologies; Jul. 2010.
Choquet, Claude, ARC+: Today's Virtual Reality Solution for Welders, Jun. 1, 2008.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19-22, 2007.
EWI, "EWI ArcCheck," marketing brochure, Columbus, Ohio, 1 page.
EWI, "EWI SkillBuilder," marketing brochure, Columbus, Ohio, 1 page.
Fast et al., Virtual Training for Welding, Proceedings of the Third IEEE and ACM International Symposium on Mixed and Augmented Reality (ISMAR 2004); 0-7695-2191-6/04; 2004.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-RA-Panel_Final_Reports/FY08_Virtual_Welder_Final_Report.pdf.
Fite-Georgel, Pierre; "Is there a Reality in Industrial Augmented Reality?" 10th IEEE International Symposium on Mixed and Augmented Reality (ISMAR), 2011.
Fridenfalk et al., Design and Validation of a Universal 6D Seam Tracking System in Robotic Welding Based on Laser Scanning, Industrial Robotics: Programming, Simulation, and Application, ISBN 3-86611-286-6, p. 702, ARS/plV, Germany, Dec. 2006, edited by Kin Huat.
Fronius "The Ghost": http://www.fronius.com/cps/rde/xchg/SID-3202EAB7-AE082518/fronius_interational/hs.xsl/79_15490_ENG_HTML.htm; 2006.
Fronius International GmbH—Focus on Welding—Fronius Virtual Welding; http://www.fronius.com/cps/rde/xchg/SID-99869147-0110E322/fronius_intenational/hs.xsl/79_15490_ENG_HML.htm; 2006.
Fronius Perfect Welding; 06,3082, EN v01 2010 aw05; Virtual Welding—The training method of the future; Feb. 20, 2012.
ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Hasser (1995, 1996).

GAWDA—Welding & Gases Today Online GAWDA Media Blog; Will Games Turn Welding into a Virtual Market? Friday, Dec. 2, 2011; http://www.weldingandgasestoday.org/blogs/Devin-OToole/index.php/ta. . . .
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hashimoto, Nobuyoshi et al., "Training System for Manual Arc Welding by Using Mixed Reality: Reduction of Position-Perception Error of Electrode Tip," Journal of the Japan Society for Precision Engineering, vol. 72, pp. 249-253, 2006.
Jemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," FABTECH International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.
Hillers, Bernd, Dorin Aiteanu, Axel Graser, "Augmented Reality—Helmet for the Manual Welding Process," Virtual and Augmented Reality Applications in Manufacturing, Institute of Automation, Universtity of Bremen, 2004.
Himperich, Frederick, "Applications in Augmented Reality in the Automotive Industry," Fachgebiet Augmented Reality, Department of Informatics, Jul. 4, 2007, p. 1-21.
European Extended Search Report Appln No. 20186361.0 dated Feb. 9, 2021, 7 pages.
European Extended Search Report Appln No. 20186372.7 dated Feb. 9, 2021, 4 pages.
Natural Point, Trackir; http://www.naturalpoint.com/trackir/, Dec. 2003.
Numerical Simulation F Arc Welding Process and its Application Dissertation for Ohio State University by Min Hyun Cho, M.S. 2006: See Internet as this document is security protected) ohttps://etd.ohiolink.edu/ap:0:0:APPLICATION_PROCESS=DOWNLOAD_ETD_SUB_DOC_ACCNUM:::F1501_ID:osu1155741113, attachment.
NZ Manufacturer Game promotes welding trade careers; http://nzmanufacturer.co.nz/2011/11/gme-promotes-welding-trade-careers/. . . Compentenz Industry Training; www.competenz.org.nz; Game promotes welding trade careers, Nov. 7, 2011.
OptiTrack: Motion Capture Systems: http://www.naturalpoint.com/optitrack/, Mar. 2005.
Penrod, Matt; "New Welder Training Tools," EWI PowerPoint presentation, 2008.
PhaseSpace: Optical Motion Capture: http://phasespace.com/, 2009.
Playstation; Move Motion Controller: http://us.playstation.com/ps3/playstation-move/, Mar. 2010.
Polhemus: Innovation in Motion: http://polhemus.com/?page=researchandtechnology, 1992.
Porter et al., EWI-CRP Summary Report SR0512, Jul. 2005—Virtual Reality Welder Training.
Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No. S1051 Navy Man Tech Program; Project Review for Ship Tech 2005,-Mar. 1, 2005, Biloxi, MS, http://www.nsrp.org/6-Presentations/WD/Virtual_Welder.pdf.
Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications; 2007.

(56) References Cited

OTHER PUBLICATIONS

Quebec International, May 28, 2008 'Video Game' Technology to Fill Growing Need; http://www.mri.gouv.qc.ca/portail/_scripts/actualities/viewnew.sap?NewID=5516.

Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.

Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.

Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.

ShotOfFuel; Wii Head Tracking for 3D, http://www.youtube.com/watch?v=1x5ffF-0Wr4, Mar. 19, 2008.

Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.

TCS News & Events: Press Release: TCS wins the "People Choice" award from National Science Foundation, USA, pp. 1-6; Press Release May 21, 2012; http://www.tsc.com/news_events/press_releases/Pages/TCS_People_Choice_award_Natio . . . .

TeachWELD: Welding Simulator/Hands-On Learning for Welding: http://realityworks.com/products/teachweld-welding-simulator; 2012.

Terebes; miscellaneous examples from http://www.terebes.uni-bremen.de.

The Rutgers Master II—New Design Force-Feedback Glove by Mourad Bouzit, Member, IEEE,Grigore Burdea, Senior Member, IEEE, George Popescu, Member, IEEE, and Rares Bolan, Student Member, found in IEEE/ASME Transactions on Mechatronics, vol. 7, No. 2, Jun. 2002.

thefabricator.com—Arc Welding Article; Heston, Tim, Virtual welding—Training in a virtual environment gives welding students a leg up—Mar. 11, 2008.

Tschirner, Petra, Hillers, Bernd, and Graeser, Axel; "A Concept for the Application of Augmented Reality in Manual Gas Metal Arc Welding," Proceedings of the International Symposium on Mixed and Augmented Reality, 2002.

Vicon: Motion Capture Systems: http://vicon.com/, Dec. 1998.

Virtual Reality Training Manual Module 1—Training Overvie—A Guide for Gas Metal Arc Welding—EWI 2006.

VRTEX 360 Operator's Manual, Lincoln Electric, Oct. 2012.

VRTEX 360, Lincoln Electric, Dec. 2009.

Weld Training Solutions, REALWELD, The Lincoln Electric Company, Jul. 2015.

Welding Journal, American Welding Society, Nov. 2007, https://app.aws.org/wj/2007/11/WJ_2007_11.pdf.

White, S., et al., "Low-Cost Simulated MIG Welding for Advancement in Technical Training," Virtual Reality, 15, 1, 69-81, Mar. 2011. ISSN:13594338 [Retrieved from EBSCOhost, Jun. 15, 2015].

Canadian Office Action Appln No. 2,937,596 dated Mar. 18, 2019.

EP Office Action, EP Appln. No. 20186361.0 dated Jan. 31, 2022, 4 pages.

EP Office Action, EP Appln No. 20186372.7, dated Jan. 31, 2022, 5 pages.

* cited by examiner

CONNECTION BOXES FOR GAS TUNGSTEN ARC WELDING TRAINING SYSTEMS

TECHNICAL FIELD

The present disclosure generally relates to gas tungsten arc welding (GTAW) training systems and, more particularly, to connection boxes for GTAW training systems.

BACKGROUND

The welding industry has a shortage of experienced and skilled operators. Additionally, even experienced welders have difficulty maintaining important welding techniques (e.g., torch work angles, torch travel angles, contact tip-to-work distance, travel speed, aim, etc.) throughout welding processes. Weld training systems make it possible for both experienced and inexperienced weld operators to practice producing high quality welds.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to connection boxes for GTAW training systems, substantially as illustrated by and/or described in connection with at least one of the figures, and as set forth more completely in the claims.

These and other advantages, aspects and novel features of the present disclosure, as well as details of an illustrated example thereof, will be more fully understood from the following description, claims, and drawings.

Figure 1:
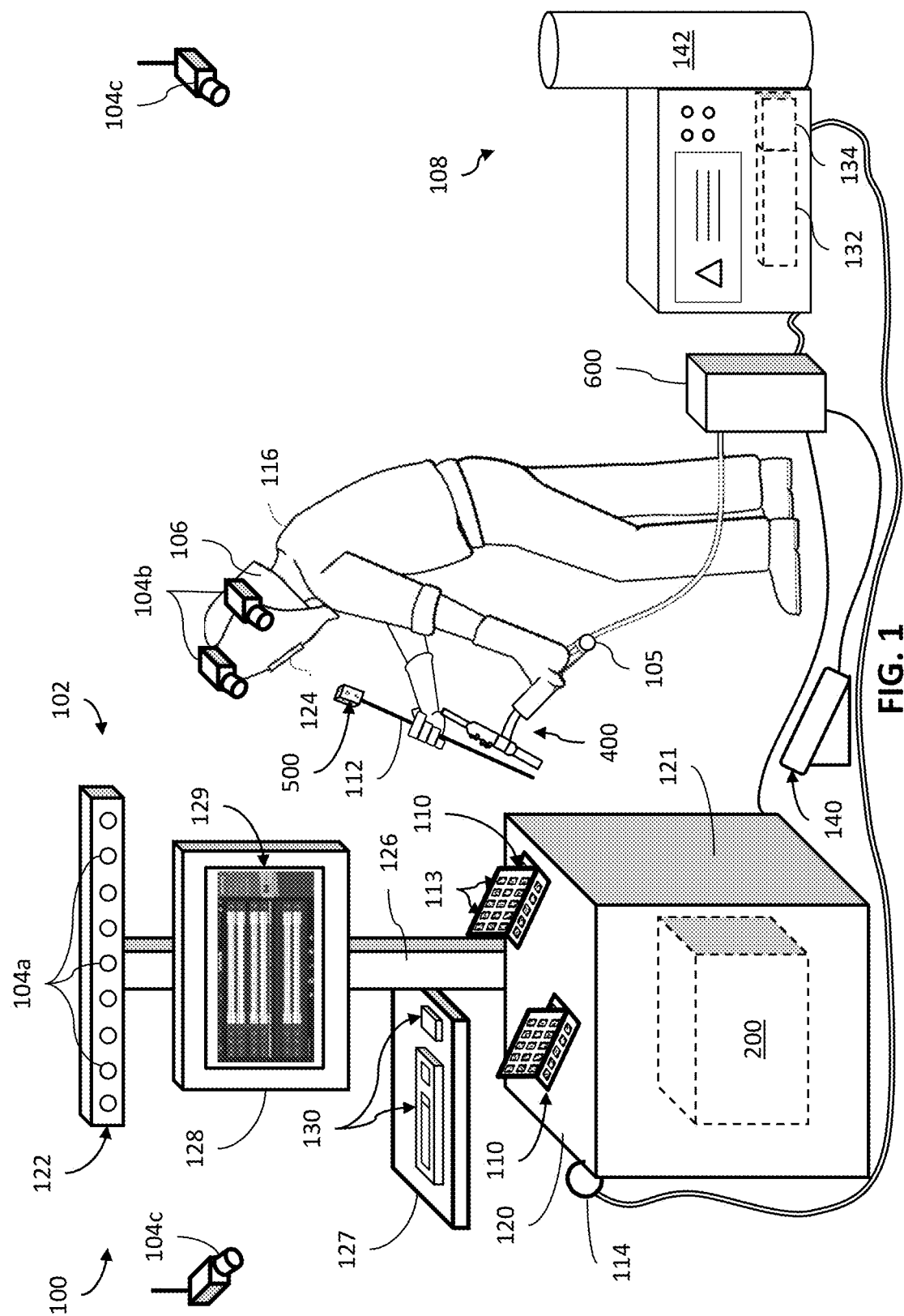
FIG. 1 shows an example of a gas tungsten arc welding (GTAW) training system, in accordance with aspects of this disclosure.

The figures are not necessarily to scale. Where appropriate, the same or similar reference numerals are used in the figures to refer to similar or identical elements. For example, reference numerals utilizing lettering (e.g., sensor 104a, sensor 104b) refer to instances of the same reference numeral that does not have the lettering (e.g., sensors 104).

DETAILED DESCRIPTION

Some examples of the present disclosure relate to a connection box of a gas tungsten arc weld (GTAW) training system, comprising a remote control input device configured to receive a remote control signal from a remote control, a remote control output device configured to provide the remote control signal to a welding-type power supply, a switch configured to selectively couple the remote control input device to the remote control output device, and control circuitry configured to provide a training signal representative of the remote control signal to a weld training controller, in a live arc mode, control the switch to selectively couple the remote control input device to the remote control output device to enable communication of the remote control signal to the welding-type power supply, and in a simulation mode, control the switch to selectively decouple the remote control input device from the remote control output device to prevent communication of the remote control signal to the welding-type power supply.

In some examples, the remote control input device comprises an input port or input communication circuitry, and the remote control output device comprises an output port or output communication circuitry. In some examples, the remote control comprises a foot pedal. In some examples, the switch comprises a relay. In some examples, the connection box further comprises a power input port configured to receive welding-type power from the welding-type power supply, and a power output port configured to provide the welding-type power to a GTAW welding torch, the power input port and power output port being electrically connected through a power line. In some examples, the connection box further comprises a sensor in electrical communication with the control circuitry and power line, the sensor configured to detect a current or voltage at the power line. In some examples, the control circuitry is further configured to provide a signal representative of the current or voltage to the weld training controller.

In some examples, the connection box further comprises a torch connection device configured for electrical connection to a GTAW welding torch, the control circuitry configured to provide one or more torch output signals to the GTAW welding torch via the torch connection device. In some examples, the control circuitry is further configured to receive one or more torch input signals from the GTAW welding torch via the torch connection device, the one or more torch input signals being representative of a selection of the live arc mode or the simulation mode. In some examples, the connection box further comprises a training connection device configured for electrical connection to the weld training controller, the control circuitry configured to provide the training output signal to the weld training controller via the training connection device, wherein the control circuitry is further configured to receive one or more training input signals from the weld training controller via the training connection device, the one or more training input signals being representative of the live arc mode or the simulation mode.

Some examples of the present disclosure relate to a method for operating a connection box of a GTAW training system, the method comprising receiving a remote control signal from a remote control of a GTAW welding torch via a remote control input device of the connection box, providing a training signal representative of the remote control signal to a weld training controller via a training connection device of the connection box, in a live arc mode, providing the remote control signal to the welding-type power supply, and in a simulation mode, preventing the remote control signal from being provided to the welding-type power supply.

In some examples, the method further comprises receiving a mode signal from the weld training controller via the training connection device, the mode signal being representative of a live arc mode or a simulation mode. In some examples, providing the remote control signal to the welding-type power supply comprises controlling a switch of the connection box to selectively couple the remote control input device to a remote control output device of the connection box, the remote control output device configured to couple to a welding-type power supply. In some examples, preventing the remote control signal from being provided to the welding-type power supply comprises controlling a switch to selectively decouple the remote control input device from a remote control output device of the connection box, the remote control output device configured to couple to a welding-type power supply. In some examples, the remote control comprises a foot pedal.

In some examples, the method further comprises receiving one or more torch input signals from the GTAW welding torch via a torch connection device of the connection box, and sending the one or more torch input signals to the weld training controller via the training connection device, the one or more torch input signals being representative of a selection of the live arc mode or the simulation mode. In some examples, the method further comprises controlling, via the torch connection device of the connection box, one or more torch output indicators of the GTAW welding torch. In some examples, the method further comprises controlling, via the torch connection device of the connection box, one or more torch markers of the GTAW welding torch. In some examples, the method further comprises measuring, via a sensor, a current or voltage at a power line of the connection box, the power line being in electrical communication with a power port configured for electrical connection to the welding-type power supply. In some examples, the method further comprises sending one or more signals representative of the current or voltage to the training controller via the training connection device.

Some examples of the present disclosure relate to gas tungsten arc welding (GTAW) training systems. While existing weld training systems exist for gas metal arc welding (GMAW) systems and shielded metal arc welding (SMAW) systems, GTAW systems present their own particular challenges when it comes to weld training. For example, maneuvering the welding "torch" or "gun" in GMAW and/or SMAW systems also maneuvers the filler material. Thus, changing the position and/or orientation of the "torch" or "gun" also changes the position and/or orientation of the filler material. In GTAW systems the filler material is separate (and/or separately maneuvered) from the torch or gun. Thus, changing the position and/or orientation of the "torch" or "gun" does not change the position and/or orientation of the filler material. Additionally the filler material in GMAW and/or SMAW systems also acts as the electrode, while the filler material in GTAW systems is entirely separate from the electrode. Further, in GMAW and/or SMAW systems, the electrical power for creation of the arc is typically either continuous (e.g., in the case of SMAW) or activated via a trigger on the torch or gun itself (e.g., in the case of GMAW). In GTAW systems, the electrical power for creating the arc may be activated (and/or incrementally controlled) using a remote control (e.g., a foot pedal) that is separate from both the torch/gun and the filler material.

The present disclosure contemplates a weld training system specific to gas tungsten arc welding. In some examples, the GTAW training system of the present disclosure comprises a GTAW torch and a filler rod attachment having one or more markers to facilitate position and/or orientation detection and/or tracking of the GTAW torch and filler rod. One or more sensors of the GTAW training system are configured to capture data relating to the markers of the GTAW torch and/or filler rod attachment. A training controller of the GTAW training system may use the markers and/or sensor data to track and/or determine positions, orientations, and/or movement of the GTAW torch and/or filler rod. The positions, orientations, and/or movement may be analyzed in conjunction with welding parameter data to provide training feedback.

In some examples, a connection box of the GTAW training system coordinates delivery of welding-type power to the GTAW torch during training. In some examples, a remote control (e.g., foot pedal) may be activated at different levels to command different levels of welding-type power from a welding-type power supply. In some examples, the connection box may selectively enable or disable communication between the remote control and welding-type power supply during training. In some examples, this selective enablement/disablement may be based on whether the GTAW training system is in a live-arc mode or simulation mode.

FIG. 1 shows an example of a GTAW training system 100. In some examples, some or all of the GTAW training system 100 may comprise a virtual, augmented, and/or mixed reality GTAW training system 100. As shown, the GTAW training system 100 comprises a welding stand 102, several sensors 104, a welding-type power supply 108, a connection box 600, a remote control 140, a GTAW torch 400, a filler rod 112, and a filler rod attachment 500.

Figure 5A:
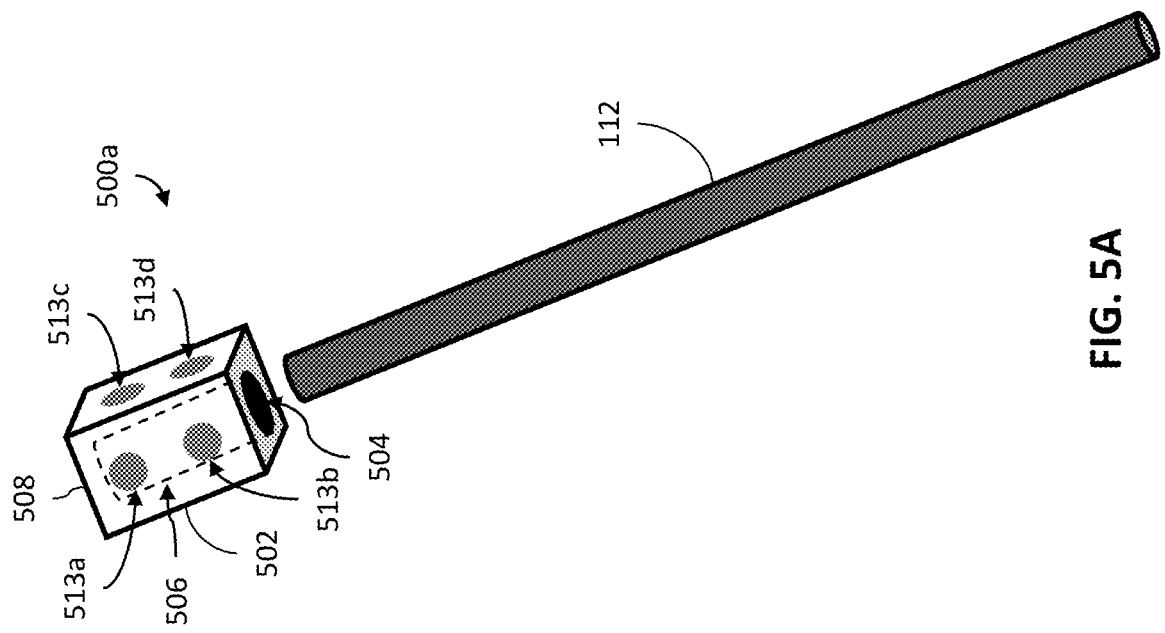
FIG. 5a shows an example filler rod and filler rod attachment that may be used in the example GTAW training system of FIG. 1, in accordance with aspects of this disclosure.

FIG. 5A shows an example filler rod attachment 500a of the GTAW training system 100. In the example of FIG. 5A, the filler rod attachment 500a comprises a cuboid 502. As shown, the cuboid 508 has several flat interconnecting faces. While shown as a cuboid 502 in the example of FIG. 5A, in some examples, the filler rod attachment 500a may be a differently shaped object having several flat interconnected faces. As shown, the cuboid 502 has an aperture 504 on one face. As shown, the aperture 504 leads to a channel 506 extending partway through the cuboid 502, and terminating at or before an end 508 of the cuboid 502. In some examples, the aperture 504 and/or channel 506 is sized to comfortably and/or snugly receive a portion of the filler rod 112, so as to frictionally retain the filler rod attachment 500a on the filler rod 112.

In the example of FIG. 5A, the cuboid 502 includes several attachment markers 513. As shown, the attachment markers 513 are passive markers, such as, for example, reflectors. In some examples, the attachment markers 513 may instead be active markers, such as, for example, light emitting diodes (LEDs). In the example of FIG. 5A two attachment markers 513 are disposed on each face of the cuboid 502. In some examples, more or less attachment markers 513 may be disposed on each face. In some examples, a distance between two attachment markers 513 on each same face of the cuboid 502 (e.g., 513a and 513b) may be unique as compared to the distance between any two attachment markers 513 on adjacent faces of the cuboid 502 (e.g., 513a and 513c/513d, or 513b and 513c/513d). In such a way, the GTAW training system 100 may be able to determine which attachment markers 513 are on a same face of the cuboid 502 by comparing distances between attachment markers 513 to thereby determine which pairs (and/or sets) of attachment markers 513 define an axis parallel to an axis of the filler rod 112. Once a parallel axis is known, the GTAW training system 100 can project the axis towards the GTAW torch 400 (and/or tip of the tungsten electrode 414) and/or workpiece 110 to determine the orientation and/or angle at which the filler rod 112 might be interacting with the arc, GTAW torch 400 (and/or tip of the tungsten electrode 414), and/or workpiece 110. Additionally, in some examples, the attachment markers 513 may be arranged in such a way as to constitute a rigid body, which the GTAW training system 100 may use to determine both relative position and orientation.

Figure 5C:
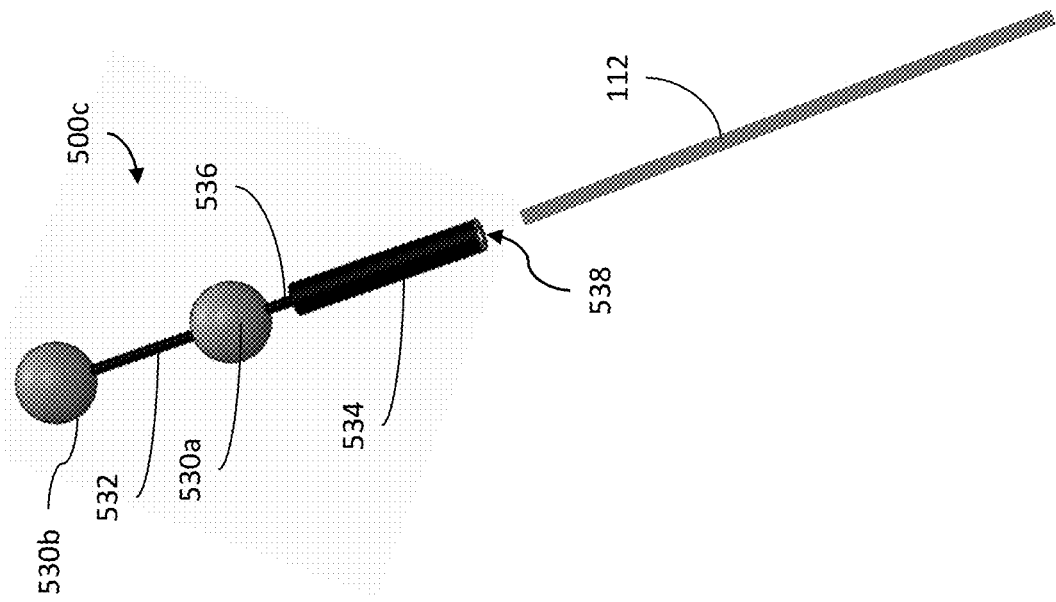
FIG. 5c shows another example filler rod and filler rod attachment that may be used in the example GTAW training system of FIG. 1, in accordance with aspects of this disclosure.
Figure 5B:
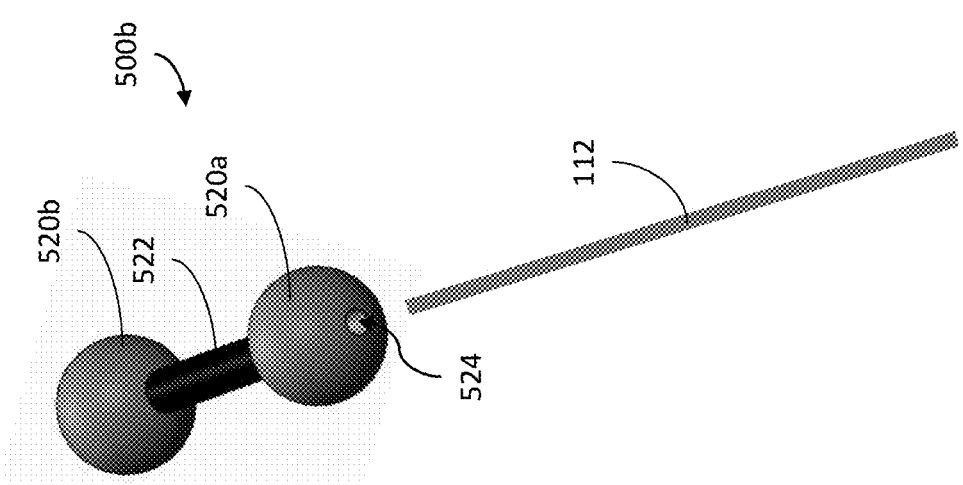
FIG. 5b shows another example filler rod and filler rod attachment that may be used in the example GTAW training system of FIG. 1, in accordance with aspects of this disclosure.

FIG. 5B shows another example filler rod attachment 500b. In the example of FIG. 5B, the filler rod attachment 500 comprises two spheres 520 connected together via a hollow tube 522. As shown, the sphere 520a includes an opening 524. In some examples, the opening comprises an entrance to a bore in the sphere 520a that is collinear with the hollow tube 522, such that the filler rod 112 may be inserted through the opening 524 (and/or the sphere 520a) into the hollow tube 522. In some examples, a channel extending through the hollow tube 522 may terminate at the sphere 520b. In some examples, the channel may extend partway through the sphere 520b. In some examples, the aperture 524, bore extending through the sphere 520a (and/or sphere 520b), and/or hollow tube 522 may be sized to comfortably and/or snugly receive a portion of the filler rod 112, so as to frictionally retain the filler rod attachment 500b on the filler rod 112. In some examples, each sphere 520 may comprise an active or passive marker, so as to facilitate detection (and/or axis projection) by the GTAW training system 100.

FIG. 5C shows another example filler rod attachment 500c. In the example of FIG. 5C, the filler rod attachment 500 comprises two spheres 530 connected together via a solid rod 532, rather than a hollow tube. Instead, a hollow tube 534 is attached to the sphere 530a via an extender rod 536 that extends from the sphere 530a. In the example of FIG. 5C, the extender rod 536 is collinear with the solid rod 532. In some examples, the solid rod 532 may extend through the sphere 530a, and the extender rod 536 may be part of the solid rod 532. As shown, the hollow tube 534 includes an opening 538 configured to receive the filler rod 112. In some examples, the opening 538 and/or hollow tube 534 may be sized to comfortably and/or snugly receive a portion of the filler rod 112, so as to frictionally retain the filler rod attachment 500c on the filler rod 112. In some examples, each sphere 530 may be an active or passive marker, so as to facilitate detection (and/or axis projection) by GTAW training system 100.

In the example of FIG. 1, an operator 116 wearing a welding helmet 106 with a faceplate 124 is shown manipulating the GTAW torch 400 and filler rod 112 proximate the welding stand 102 and several workpieces 110. As shown, the GTAW torch 400 is coupled to the connection box 600 via a welding cable. While one GTAW torch 400 is shown in FIG. 1, in some examples, the GTAW training system 100 may include multiple GTAW torches 400. In the example of FIG. 1, a sensing device 105 (e.g., accelerometer) is further integrated with the GTAW torch 400 to facilitate tracking of the position, orientation, and/or movement of the GTAW torch 400.

Figure 4:
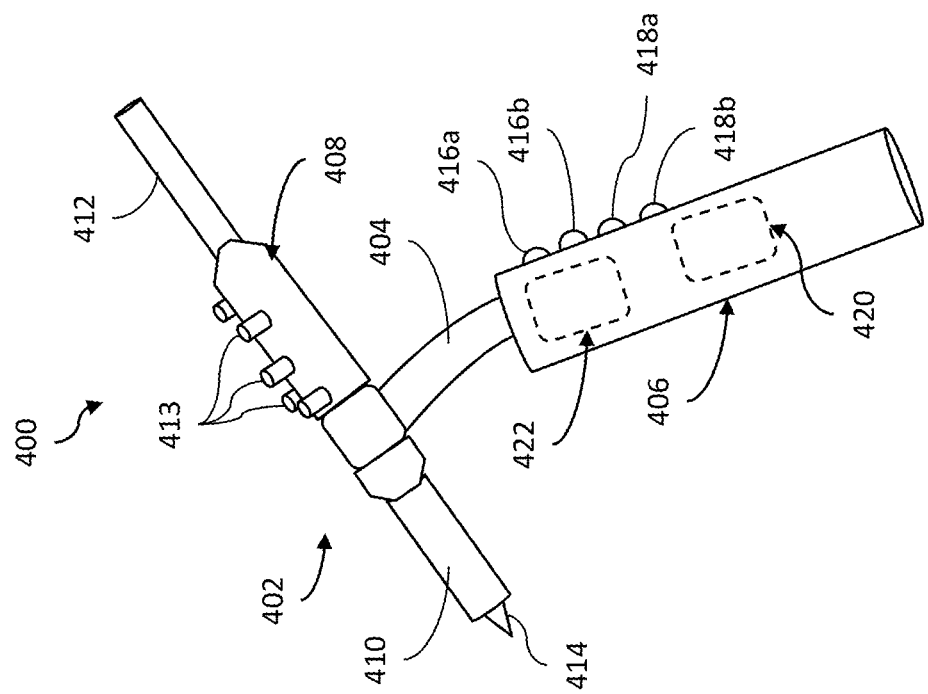
FIG. 4 shows an example GTAW torch that may be used in the example GTAW training system of FIG. 1, in accordance with aspects of this disclosure.

FIG. 4 shows an enlarged depiction of the example GTAW torch 400 of the example GTAW training system 100 of FIG. 1. In the example of FIG. 4, the GTAW torch 400 includes a head 402 attached to a handle 406 via a neck 404. In some examples, the neck 404 may be rigid. In some examples, the neck 404 may be flexible, to allow the head 402 to be reoriented and/or adjusted with respect to the handle 406. As shown, the torch head 402 comprises a body 408 attached to a nozzle 410, and a back cap 412 that extends from the rear of the body 408. In some examples, the body 408 may be separable from the GTAW torch 400, so that the body 408 may be detached from and/or attached to different torches.

In the example of FIG. 4, a tungsten electrode 414 extends from the nozzle 410. Within the nozzle 410, the electrode 414 may be retained by a collet (not shown). In operation, the handle 406 may be connected to a cable that routes welding-type power and/or gas to the GTAW torch 400. Within the GTAW torch 400, the welding-type power may be routed to the tungsten electrode 414 to form the arc. Gas may likewise be routed to the torch nozzle 410 to be disbursed proximate the arc. In some examples, the GTAW torch 400 may be configured as a mock torch, incapable of actual welding, and have no need for the tungsten electrode 414.

In the example of FIG. 4, the torch head 402 includes several torch markers 413 attached to the torch body 408. By attaching the torch markers 413 to the body 408 (and/or head 402), the torch markers 413 are ensured to remain in a fixed spatial relationship with the tungsten electrode 414, even if the position/orientation of the head 402 is reoriented and/or adjusted with respect to the handle 406, via the neck 404. In some examples the GTAW training system 100 may use this fixed spatial relationship to predict, estimate, and/or approximate the position and/or orientation of the tungsten electrode 414 based on the detected position and/or orientation of the torch markers 413.

In some examples, the fixed arrangement of torch markers 413 formed on the solid surface of the body 408 may define a rigid body. In some examples, the rigid body defined by the torch markers 413 may allow the GTAW training system 100 to determine both position and orientation of the GTAW torch 400. While in the example of FIG. 4, all the torch markers 413 are in one group, in some examples, the torch markers 413 may be arranged in multiple groups, with each group having at least three torch markers 413 (so as to define a rigid body). In some examples, multiple groups of torch markers 413 may facilitate consistent and/or robust tracking through a wide variety of angles and orientations. In some examples, the torch markers 413 may comprise or be retained within holes, cavities, receptacles, and/or other formations in the body 408.

In some examples, one or more of the torch markers 413 may comprise passive markers, such as, for example, reflectors, pattern markers, and/or other non-powered markers. In some examples, one or more of the torch markers 413 may comprise active markers, such as, for example, light-emitting markers (e.g., infrared light-emitting diodes (LEDs)). In some examples, active markers on the GTAW torch 400 may work better for live welding because less camera exposure is needed to capture an active marker (as compared to a passive marker). The smaller exposure time may translate into less risk of interference from other light sources near the GTAW torch 400 (e.g., the welding arc, sparks, spatter, etc.). In some examples where the torch markers 413 are active markers, the torch markers 413 may receive power through a cable attached to the handle 406 (e.g., from connection box 600) and/or from a power source internal to the GTAW torch 400 (e.g., a battery within the handle 406 or head 402). In some examples where the torch markers 413 are active markers, individual torch markers 413 (and/or individual groups of torch markers 413) may be selectively activated and/or deactivated in response to one or more control signals (e.g., from the connection box 600).

In the example of FIG. 4, the GTAW torch 400 includes torch inputs 416, torch outputs 418, and a feedback mechanism 420. While two torch inputs 416 and two torch outputs 418 are shown in the example of FIG. 4, in some examples, the GTAW torch 400 may include more or less torch inputs 416 and/or torch outputs 418. In some examples, the torch inputs 416 may comprise buttons, switches, dial, knobs, microphones, and/or other appropriate input mechanisms. In some examples, the torch outputs 418 may comprise visual outputs (e.g., display screens, lights, etc.) and/or audio outputs (e.g., speakers). In some examples, the feedback mechanism 420 may comprise a haptic feedback mechanism and/or vibrating mechanism.

As shown, the GTAW torch 400 further includes internal torch circuitry 422 in electrical communication with the torch inputs 416 and/or torch outputs 418. In some examples, the internal torch circuitry 422 may be configured to drive, control, and/or otherwise facilitate operation of the torch inputs 416, torch outputs 418, torch markers 413, and/or feedback mechanism 420. In some examples, the GTAW torch 400 may include an internal power source to power the torch inputs 416, torch outputs 418, feedback mechanism 420, torch markers 413, and/or torch circuitry 422. In some examples, the GTAW torch 400 may receive power through a cable connection (e.g., with the connection box 600) to power the torch inputs 416, torch outputs 418, feedback mechanism 420, torch markers 413, and/or torch circuitry 422.

In some examples, an operator 116 may use the torch inputs 416, torch outputs 418, and/or feedback mechanism 420 to provide input to, and receive outputs and/or feedback from, the GTAW training system 100. For example, during setup/calibration of the GTAW training system 100, the operator 116 may use one or more of the torch inputs 416 to select a live arc mode or a simulation mode. In such an example, the GTAW torch 400 may send one or more signals indicative of such a selection to the connection box 600 and/or training controller 200. As another example, the connection box 600 and/or training controller 200 may send one or more signals to the GTAW torch 400 indicative of the mode (e.g., live arc or simulation), and one or more of the torch outputs 418 may provide an appropriate indication of the mode to the operator 116. As another example, the connection box 600 (and/or torch circuitry 422) may control the feedback mechanism 420 to provide feedback (e.g., vibration) in response to some training result (e.g., good score, poor score, travel speed too fast/slow, arc length too large/small, angle too large/small, successful mode selection, etc.).

In the example of FIG. 1, a remote control 140 is also coupled to the connection box 600 via a cable. As shown, the remote control 140 is a movable foot pedal. In some examples, the remote control 140 may be a switch, trigger, button, lever, dial, and/or other appropriate control mechanism (e.g., mounted to the GTAW torch 400). In some examples, the remote control 140 is configured to detect activation (e.g., depression) and/or movement of the movable pedal, and output one or more control signals based on (and/or indicative of) the activation level and/or movement. In some examples, the remote control 140 may communicate the one or more control signals to the connection box and/or welding-type power supply 108. In some examples, an operator 116 may depress and/or move the movable pedal to different degrees to command different target levels of welding-type power for delivery to the GTAW torch 400, and the welding-type power supply 108 may interpret and/or respond accordingly to representative signals from the remote control 140. In some examples, the remote control 140 may comprise wireless communication circuitry enabling wireless communication of the remote control signals (e.g., to the connection box and/or welding-type power supply 108). In some examples, a wireless receiver configured for communication with wireless communication circuitry may instead be coupled to the connection box 600 via the cable, rather than the remote control 140 itself.

In the example of FIG. 1, the GTAW torch 400 and remote control 140 are selectively coupled to the welding-type power supply 108 through the connection box 600. As shown, the welding-type power supply 108 is also selectively coupled to a clamp 114 through the connection box 600. In some examples, the welding-type power supply 108 may be directly coupled to the clamp 114 via the cable. While only one cable is shown connecting the connection box 600 to the welding-type power supply 108 for the sake of simplicity, in some examples, multiple cables may form the connection.

In the example of FIG. 1, the clamp 114 is attached to a support platform 120 of the welding stand 102 and the welding-type power supply 108. In some examples, the clamp 114 may be attached to a workpiece 110, some other portion of the welding stand 102, or some other piece of equipment, instead of the support platform 120. While shown as connected to the power supply 108 in the example of FIG. 1, in some examples, the clamp 114 may instead be connected to the connection box 600. During live welding, the support platform 120, workpiece(s) 110, clamp 114, GTAW torch 400, and/or cables connecting the clamp 114 and/or GTAW torch 400 to the welding-type power supply 108 may form a closed circuit through which welding-type output power may be routed.

In the example of FIG. 1, the welding-type power supply 108 includes (and/or is coupled to) a gas supply 142. In some examples, the gas supply 142 supplies a shielding gas and/or shielding gas mixtures to the GTAW torch 400. A shielding gas, as used herein, may refer to any gas (e.g., $CO_2$, argon) or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

In the example of FIG. 1, the welding-type power supply 108 also includes an operator interface 144. In the example of FIG. 1, the operator interface 144 comprises one or more adjustable inputs (e.g., knobs, buttons, switches, keys, etc.) and/or outputs (e.g., display screens, lights, speakers, etc.) on the welding-type power supply 108. In some examples, the operator 116 may use the operator interface 144 to enter and/or select one or more weld parameters (e.g., voltage, current, gas type, wire feed speed, workpiece material type, filler type, etc.) and/or weld operations for the welding-type power supply 108. In some examples, the operator interface 144 may further include one or more receptacles configured for connection to (and/or reception of) one or more external memory devices (e.g., floppy disks, compact discs, digital video disc, flash drive, etc.). In some examples, the operator 116 may additionally, or alternatively, use one or more input devices 130 of the welding stand 102, and/or one or more torch inputs 416 of the GTAW torch 400, instead of the operator interface 144.

In the example of FIG. 1, the welding-type power supply 108 includes power conversion circuitry 132 configured to receive input power (e.g., from mains power, a generator, etc.) and convert the input power to welding-type output power. As shown, the welding-type power supply 108 further includes control circuitry 134 electrically coupled to and/or configured to control the power conversion circuitry 132. In some examples, the control circuitry 134 may include processing circuitry (and/or one or more processors) as well as analog and/or digital memory. In some examples, the control circuitry 134 is configured to control the power conversion circuitry 132, so as to ensure the power conversion circuitry 132 generates the appropriate welding-type output power for carrying out the target welding-type operation.

In some examples, the control circuitry 134 is also electrically coupled to and/or configured to control the gas supply 142. In some examples, the welding-type power supply 108 may control the gas supply 142 to output a target type and/or amount gas. For example, the control circuitry 134 may control a valve in communication with the gas supply 142 to regulate the gas delivered to the GTAW torch 400.

During a live arc mode of the GTAW training system, a live welding operation (and/or welding process and/or welding session) may be initiated when the operator 116 activates the remote control 140. In such an example, one or more control signals indicative of the activation may be sent from the remote control 140, through the connection box 600, to the welding-type power supply 108. Control circuitry 134 of the welding-type power supply 108 may interpret the control signals and control the power conversion circuitry 132 to output welding-type power based (at least in part) on the control signals. The welding-type power provided by the welding-type power supply 108 may be applied to the electrode 414 of the GTAW torch 400 in order to produce a welding arc between the electrode 414 and the one or more workpieces 110. The heat of the arc may melt portions of the filler rod 112 and/or workpiece 110, thereby creating a molten weld pool. Movement of the GTAW torch 400 and/or filler rod 112 (e.g., by the operator) may move the welding arc and/or weld pool creating one or more welds 111. When the welding operation is finished, the operator 116 may deactivate the remote control 140.

During a simulation mode of the GTAW training system 100, a simulated welding operation (and/or welding process and/or welding session) may be initiated when the operator 116 activates the remote control 140 and/or some other input of the GTAW training system 100 (e.g., input devices 130 and/or torch inputs 416). In such an example, one or more control signals indicative of the activation may be sent from the remote control 140 to the control box 600, which may forward the control signals to the training stand 102 (while preventing the control signals from reaching the welding-type power supply 108, as further discussed below). The training stand 102 may then simulate the welding-type power, welding arc, molten weld pool, and/or other aspects of the welding operation. When the welding operation is finished, the operator 116 may deactivate the remote control 140.

In some examples, the connection box 600 and/or welding-type power supply 108 may detect certain welding parameter data pertaining to the welding-type power supply 108, clamp 117, and/or GTAW torch 400 during a welding process. In some examples, this welding parameter data may be communicated to the welding stand 102, which may use the welding parameter data for training analysis and/or feedback. In some examples, this communication to the welding stand 102 may occur in real time, periodically during a welding operation, and/or after a welding operation has finished.

In the example of FIG. 1, the welding stand 102 includes a support platform 120 to provide support for one or more workpieces 110 and/or various training devices. In some examples, the support platform 120 may include slots and/or apertures to aid in positioning and/or orienting the workpiece(s) 110. In some examples, the workpiece(s) 110 may include an extension configured to extend into one or more of the slots and/or apertures for alignment of the workpiece 110 with the one or more slots and/or apertures. In some examples, the position and/or orientation of the workpiece(s) 110, slots, and/or apertures may be used to calibrate the GTAW training system 100. For example, a calibration device configured to be sensed by the one or more sensors 104 may be inserted into an aperture and/or slot, while user input provided to the GTAW training system 100 indicates that the calibration device is inserted into the aperture and/or slot. In some examples, the GTAW torch 400 and/or filler rod attachment 500 may be used as the calibration device. In some examples, the welding platform 120 may additionally, or alternatively, include one or more emitters configured to emit a pattern onto the support platform 120, the workpiece 110, the GTAW torch 400, and/or the operator 116. The emitters may emit the pattern in the infrared, visible, and/or ultraviolet light spectrum for detection by the one or more sensors 104 to calibrate the position and/or the orientation of the support platform 120 relative to the one or more sensors 104.

In the example of FIG. 1, the welding stand 102 further includes an arm 126 connected to and extending vertically from the support platform 120. A display monitor 128 having a display screen 129 is connected to the arm 126. In some examples, the display screen 129 may be configured for displaying weld training data and/or screens associated with welding training (e.g., corresponding to the GTAW training system 100). In some examples, a protective cover may be positioned over the display screen to block certain environmental elements from contacting the display screen 129 (e.g., weld spatter, smoke, sparks, heat, etc.). In some examples, the display monitor 128 may include additional output mechanisms, such as audio speakers, for example.

In the example of FIG. 1, a shelf 127 is also attached to the arm 126. The shelf 127 supports several input devices 130 of the welding stand 102. As shown, the input devices 130 comprise a mouse and keyboard. In some examples, additional input devices 130 may be provided, such as, for example, one or more microphones. In some examples, the display screen 129 may be a touch screen, and may be further considered an input device 130. In some examples, the torch inputs 416 of the GTAW torch 400 and/or the filler rod attachment 500 may also be used as input devices 130.

In the example of FIG. 1, the welding stand 102 further includes a sensor assembly 122 attached to the arm 126. As shown, the sensor assembly 122 includes a plurality of sensors 104a oriented towards the platform 120, operator 116, filler rod 112, and/or GTAW torch 400. In some examples, the sensor assembly 122 may be adjustable, such as via one or more knobs and/or other adjustment mechanisms. In some examples, the sensor assembly 102 (and/or sensors 104a) may be configured to record sensor data relating to objects in the welding environment (and/or in a field of view of the sensors 104) during a welding operation.

In the example of FIG. 1, the GTAW training system 100 also includes several other sensors 104 configured to record sensor data relating to objects in the welding environment (and/or in a field of view of the sensors 104). As shown, in addition to sensors 104a, the GTAW training system 100 includes sensors 104b attached to the welding helmet 106, and sensors 104c positioned around the welding environment. This arrangement of sensors 104 may enable some sensors 104 to monitor the welding environment (e.g., track movement of an object) when other sensors 104 are obscured.

In some examples, the sensors 104 may comprise, for example, motion sensors, depth sensors, cameras (e.g., infrared cameras, visible spectrum cameras, high dynamic range cameras, etc.), acoustic sensors, optical sensors, and/other appropriate sensors. In some examples, the sensor data captured by the sensors 104 may comprise one or more images, videos, sounds, temperatures, radio waves, heat waves, radiation measurements, and/or other appropriate data. In some examples, this sensor data may allow the welding stand 102 to track, detect, and/or record positions, orientations, and/or movement of objects (e.g., operator 116, filler rod 112, filler rod attachment 500, GTAW torch 400, workpiece(s) 110, etc.) in the welding environment during a welding operation.

In the example of FIG. 1, workpieces 110 include markers 113 configured to be detected by the one or more sensors 104 and/or tracked by the GTAW training system 100. In some examples, the support platform 120 may also include one or more markers built into and/or attached to the support platform to calibrate a position and/or an orientation of the support platform 120 relative to one or more sensors without a separate calibration device. In some examples, the markers 113 may be passive markers, such as, for example, reflective markers. In some examples, the markers 113 may be active markers, such as, for example, light-emitting markers (e.g., light-emitting diodes (LEDs)). In some examples, the markers 113, torch markers 413, and/or attachment markers 513 (and/or spheres 520/530) may assist the GTAW training system 100 (e.g., via sensors 104) in tracking the GTAW torch 400, filler rod 112, and/or workpiece(s) 110, and/or determining position and/or orientation of the GTAW torch 400, filler rod 112, and/or workpiece(s) 110.

In some examples, the sensors 104 may be communicatively coupled to a training controller 200 of the welding stand 102. For example, the sensors 104 may comprise communication circuitry to facilitate wired and/or wireless communication with the training controller 200. In some examples, the sensors 104 are configured to provide sensor data (e.g., image data, acoustic data, sensed data, six degrees of freedom (6 DOF) data, etc.) to the training controller 200, such as via one or more signals, for example. In some examples, the sensors 104 are further configured to receive data (e.g., configuration data, setup data, commands, register settings, etc.) from the training controller 200. In the example of FIG. 1, the training controller 200 is disposed within a cabinet 121 of the welding stand 102.

Figure 2:
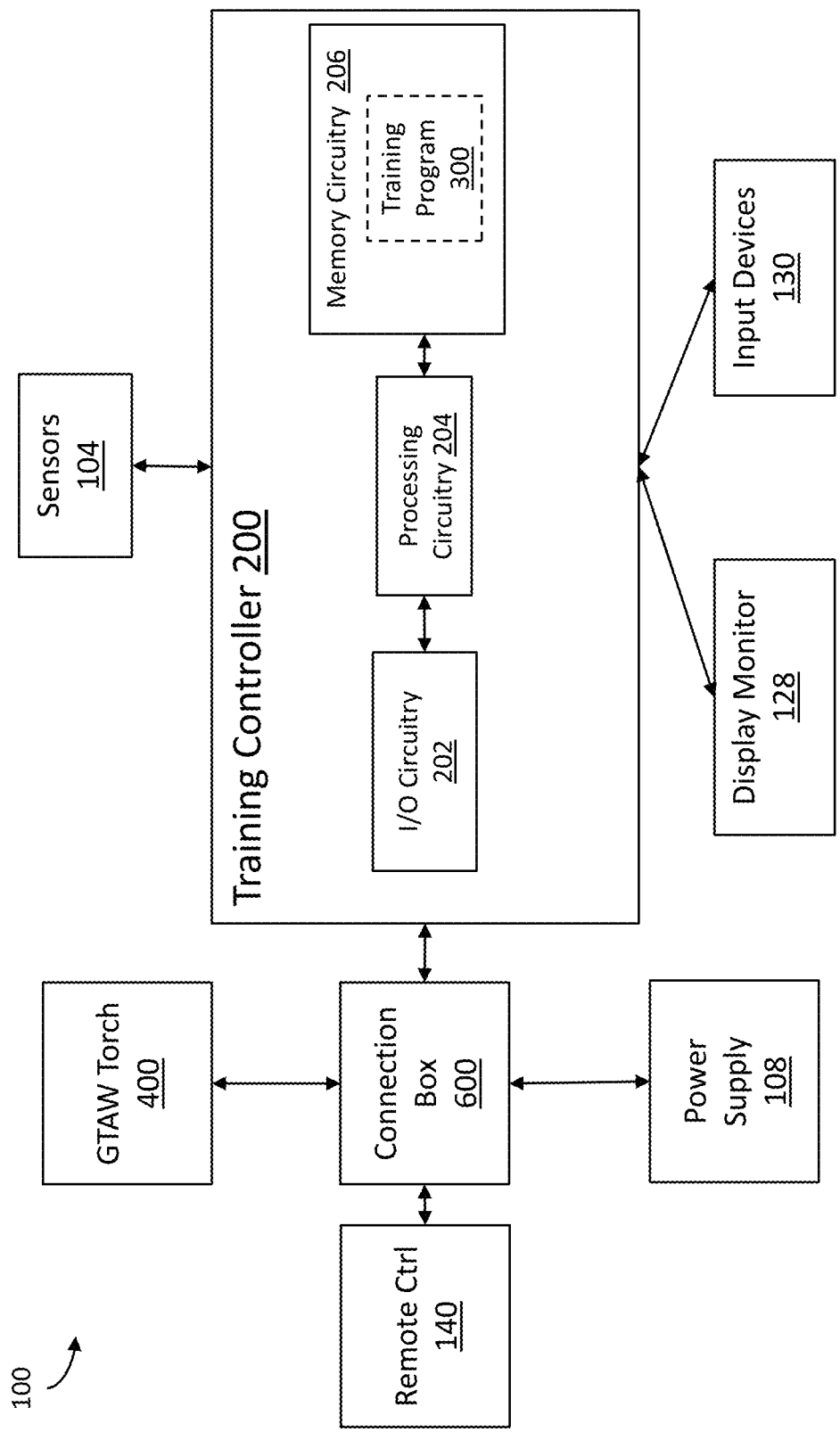
FIG. 2 is a block diagram further showing example components of the GTAW training system of FIG. 1, in accordance with aspects of this disclosure.

In the example of FIG. 2, the training controller 200 is coupled to and/or in communication with the sensors 104, display monitor 128, input devices 130, and connection box 600. As shown, the connection box 600 is, in turn, coupled to and/or in communication with the GTAW torch 400, remote control 140, and welding-type power supply 108. In some examples, the connection box 600 may additionally be coupled to and/or in communication with the clamp 114.

In some examples, the training controller 200 may comprise analog and/or discrete circuitry, and/or one or more digital computing systems. In the example of FIG. 2, the training controller 200 includes memory circuitry 206, processing circuitry 204, and input/output (I/O) circuitry 202. In some examples, the I/O circuitry 202 may comprise communication circuitry for communicating with other systems. In some examples, the communication circuitry may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves, IEEE 802.11x, Zigbee, HART, LTE, Z-Wave, WirelessHD, WiGig, etc.). In some examples, the I/O circuitry 202 may additionally comprise circuitry for interfacing with the various devices coupled to and/or in communication with the training controller 200, such as, for example, the sensors 104, GTAW torch 400, remote control 140, display monitor 128, power supply 108, and/or input devices 130.

In some examples, the processing circuitry 204 comprises one or more processors used to execute machine readable instructions (and/or processor executable) stored in memory 206. In some examples, the memory 206 stores machine readable instructions that drive some or all of the functions of the various devices coupled to and/or in communication with the training controller 200. In the example of FIG. 2, the memory 206 also stores a weld training program 300.

Figure 3:
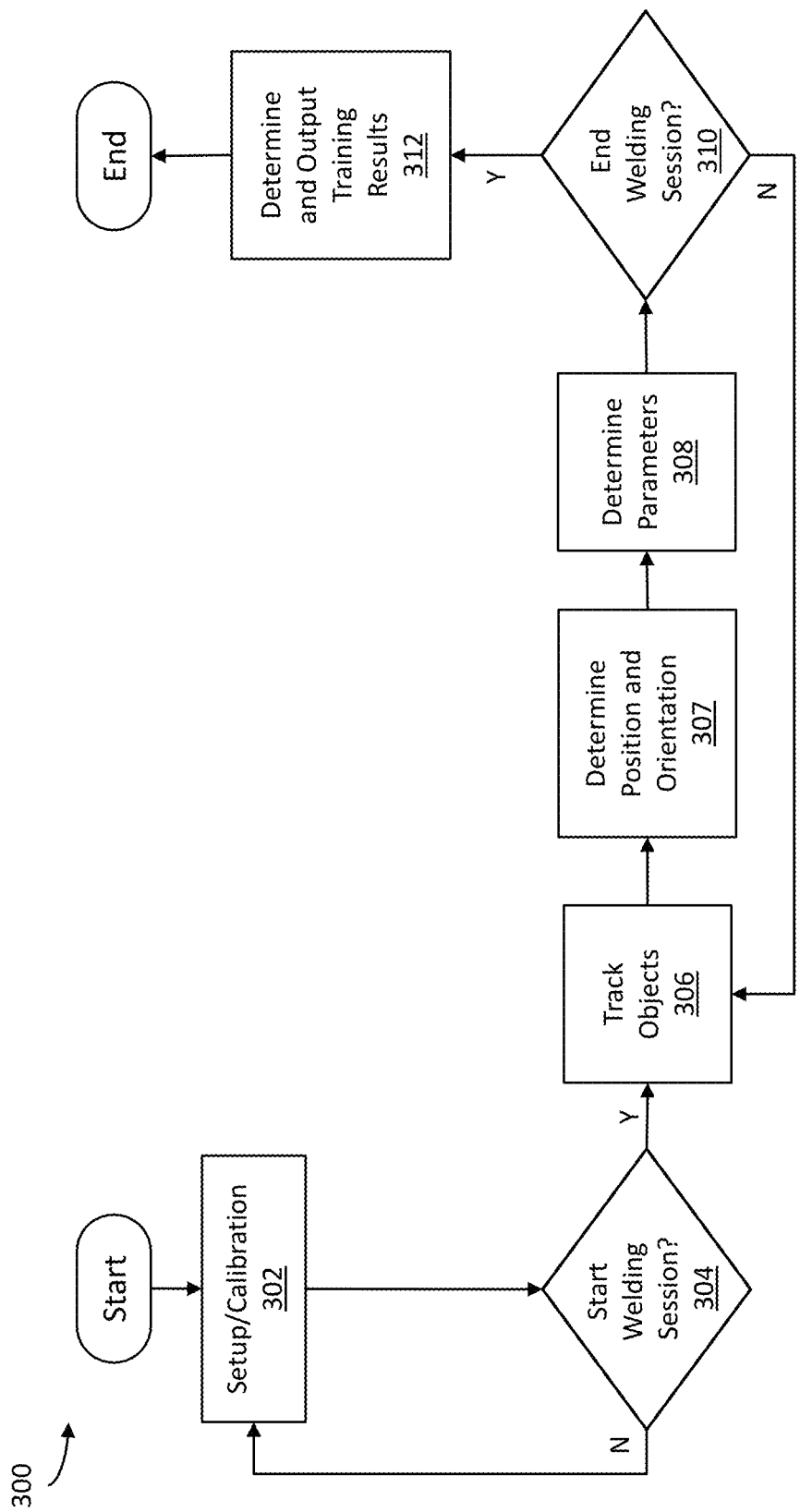
FIG. 3 is a flowchart illustrating an example GTAW training program that may be used with the GTAW training system of FIG. 1, in accordance with aspects of this disclosure.

FIG. 3 is a flowchart illustrating an example weld training program 300 of the training controller 200. In some examples, the weld training program 300 may be implemented in machine readable (and/or processor executable) instructions stored in memory 206 of the training controller 200 and/or executed by the processing circuitry 204. In the example of FIG. 3, the weld training program 300 begins at block 302. At block 302, the weld training program 300 performs certain setup and/or calibration operations. For example, the weld training program 300 may use sensor data from the sensors 104 to track one or more markers and/or calibration tools and perform necessary calibrations for the welding stand 102, GTAW torch 400, and/or filler rod attachment 500. As another example, the weld training program 300 may set a mode of the GTAW training system 100 in response to receiving one or more signals from the input devices 130 indicative of a selection of a simulation or live arc mode. As another example, the weld training program 300 may set welding operations, weld training activities, settings, and/or parameters in response to receiving one or more signals from the input devices 130 indicative of a selection of one or more welding operations, weld training activities, settings, and/or parameters. As another example, the weld training program 300 may access user information (and/or corresponding privileges, permissions, authorized welding operations/activities, etc.) in response to receiving one or more signals from the input devices 130 indicative of a user login and/or user credentials.

In the example of FIG. 3, the weld training program 300 proceeds to block 304 after block 302. At block 304, the weld training program 300 determines whether a welding session should begin and/or has begun. In some examples, a welding session may comprise one or more welding operations. In some examples, the welding session may be part of a weld training activity. In some examples, the determination at block 304 may comprise determining whether there has been a selection to begin a welding session, weld training activity, and/or welding operation (e.g., via the input devices 130, GTAW torch 400, remote control 140, and/or operator interface 144). In some examples, the determination may comprise determining whether block 302 has been satisfactorily completed. In some examples, the determination may comprise determining whether the GTAW torch 400 has been activated (e.g., via remote control 140). If the weld training program 300 determines that the welding session should not begin or has not begun, then the weld training program 300 returns to block 302. If the weld training program 300 determines that the welding session should begin or has begun, the weld training program 300 proceeds to block 306.

In the example of FIG. 3, the weld training program 300 tracks objects (e.g., the GTAW torch 400, filler rod 112 and/or filler rod attachment 500, workpiece(s) 110, welding stand 102, operator 116, etc.) in the nearby welding environment at block 306. In some examples, the weld training program 300 may use sensor data received from the sensors 104 (and/or sensing device 105) to perform the tracking. For example, the sensors 104 may capture sensor data relating to the welding environment within their respective fields of view and communicate the sensor data to the training controller 200 via one or more data signals. The weld training program 300 may process the sensor data to detect, recognize, and/or track the objects. In some examples, the weld training program 300 may use the markers 113, torch markers 413, and/or attachment markers 513 (and/or spheres 520/530) to detect, recognize, and/or track the objects.

In the example of FIG. 3, the weld training program 300 proceeds to block 307 after block 306. At block 307, the weld training program 300 determines position and/or orientation of one or more objects (e.g., relative to other objects) in the welding environment. In some examples, the weld training program 300 may determine the positions and/or orientations based on the detection, recognition, and/or tracking of the objects via the sensor data. For example, the weld training program 300 may determine one or more positions and/or orientations of the GTAW torch 400, filler rod 112, workpiece(s) 110, and/or operator 116 relative to the support platform 120 and/or other elements of the GTAW training system 100 based on data captured by the sensors 104.

In the example of FIG. 3, the weld training program 300 proceeds to block 308 after block 307. At block 308, the weld training program 300 determines one or more parameters of the GTAW training system 100. In some examples, the one or more parameters may include one or more torch parameters (e.g., torch work angle, torch travel angle, torch travel speed, torch aim, arc length, etc.), training parameters (e.g., contact to work distance, deposition amount, porosity, penetration, etc.), welding parameters (e.g., voltage, current, gas flow/disbursement, arc length, etc.), filler rod parameters (e.g., rod work angle, rod travel angle, dipping rate/frequency/duration, weave shape/amplitude/frequency, etc.), and/or other relevant parameters. In some examples, the weld training program 300 may determine the one or more parameters based on positions and/or orientations determined at block 307, the detection, recognition, and/or tracking of the objects via data from sensors 104 at block 306, data received from the detectors 150 of the welding-type power supply 108, data received from one or more sensors of the connection box 600 (discussed further below), set up and/or calibrations performed at block 302, and/or other pertinent information.

In the example of FIG. 3, the weld training program 300 proceeds to block 310 after block 308. At block 310, the weld training program 300 determines whether the welding session has or should be ended. In some examples, this determination may comprise determining whether there has been a selection to end the welding session and/or welding operation (e.g., via the input devices 130, remote control 140, and/or operator interface 144). In some examples, the determination may comprise determining whether the GTAW torch 400 has been deactivated (e.g., via remote control 140). If the weld training program 300 determines that the welding session has not or should not be ended, then the weld training program 300 returns to block 306. If the weld training program 300 determines that the welding session has or should be ended, the weld training program 300 proceeds to block 312.

In the example of FIG. 3, the weld training program 300 determines one or more training results at block 312. In some examples, the training results may be determined based on the parameters at block 312 (and/or the tracking data and/or position/orientation data of blocks 306 and 307). In some examples, the training results 208 may comprise one or more scores, grades, ratings, collections of parameters, summaries of welding sessions (and/or welding operation, training activity, etc.), user (and/or operator 116, participant, etc.) information, and/or other weld training feedback pertaining to the welding session(s) (and/or welding operation(s), training activities, etc.). In some examples, the training results may comprise two or more of the parameters synchronized over time. In some examples, the scores, grades, and/or ratings may be based at least in part on a comparison of the parameters with one or more parameters from prior welding sessions (and/or welding operation(s), training activities, etc.). In some examples, the prior welding sessions (and/or welding operation(s), training activities, etc.) and/or associated parameters may stored in memory 206. In some examples, the training controller 200 may associate the training results and/or parameters with the identity of the operator 116, such as via a unique number associated with the operator 116, the name of the operator 116, and/or other identification information of the operator 116.

At block 312, the weld training program 300 additionally outputs the training results 208. In some examples, outputting the training results may comprise outputting to the display screen 129 and/or other output mechanism of the GTAW training system 100. While shown as executing following the end of the welding session at block 310, in some examples block 800 may execute prior to the end of the welding session. For example, the weld training program 300 may continuously determine and/or output the training results 208 in real time during the welding session, so as to enable live streaming. In the example of FIG. 3, the weld training program 300 ends after block 312.

Figure 6:
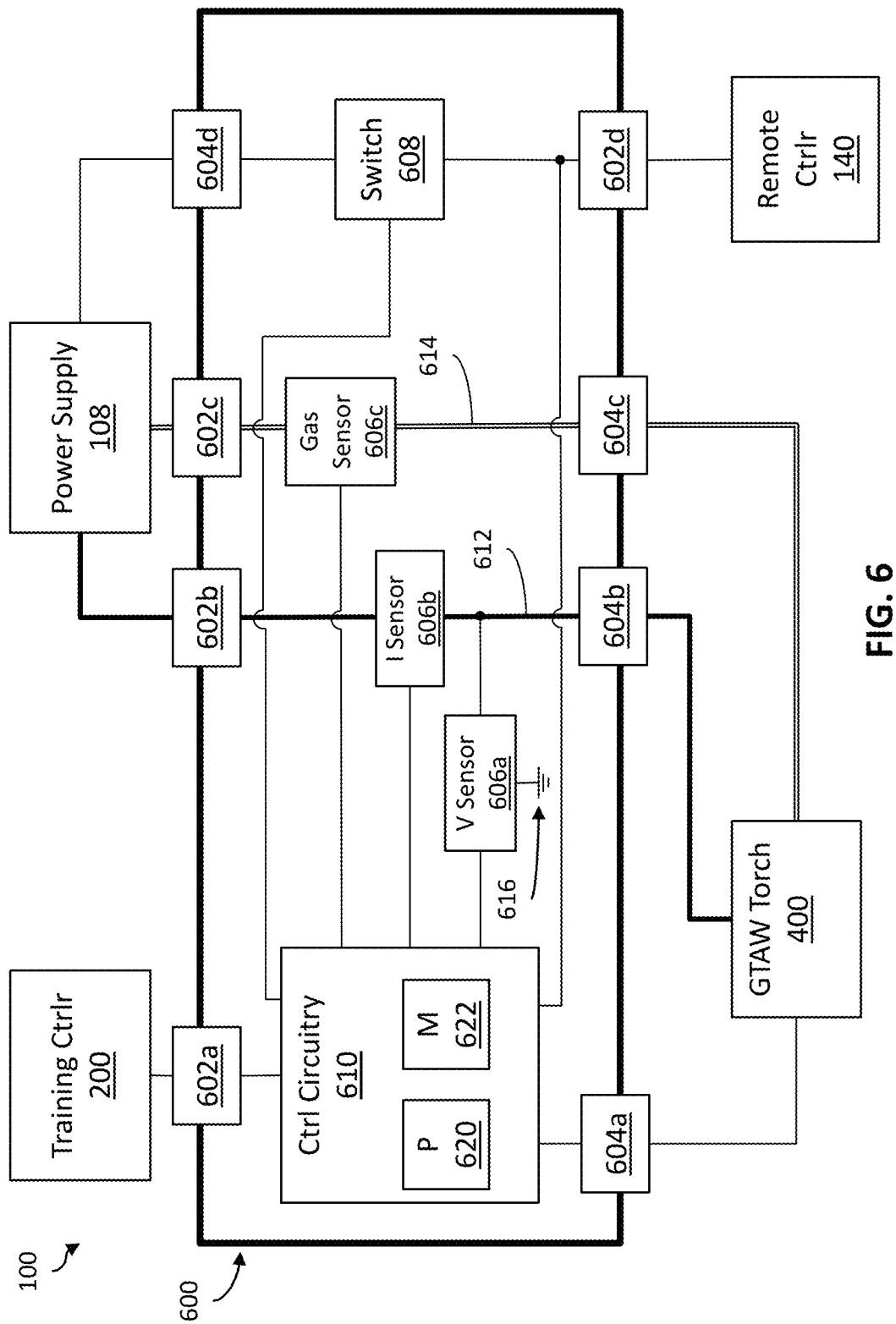
FIG. 6 is a block diagram showing example components of a connection box of the GTAW training system of FIG. 1 in relation to other components of the GTAW training system of FIG. 1, in accordance with aspects of this disclosure.

FIG. 6 is a block diagram showing more detailed components and connections of the connection box 600 of FIG. 1. In the example of FIG. 6, the connection box 600 includes input devices 602, output devices 604, box sensors 606, control switch 608, and box control circuitry 610. As shown, input device 602a is electrically connected to the training controller 200, while the input device 602b and output device 604d are electrically connected to the welding-type power supply 108, and the input device 602c is fluidly connected to the welding-type power supply 108 (e.g., for communication of shielding gas). As depicted on the other side of the connection box 600 in FIG. 6, the output device 604a and output device 604b are electrically connected to the GTAW torch 400, while the output device 604c is fluidly connected to the GTAW torch 400, and the input device 602d is electrically connected to the remote control 140. Within the connection box 600, both the input device 602a and output device 604a are electrically connected to the box control circuitry 610 in the example of FIG. 6. Input device 602d is also depicted as electrically connected to the box control circuitry 610. As shown, input device 602b and output device 604b are electrically connected to each other via power line 612. Likewise, input device 602c is shown as fluidly connected to output device 604c via gas line 614.

In the example of FIG. 6, input device 602d is selectively connected to output device 604d through switch 608. In some examples, switch 608 may comprise one or more switches, relays, transistors, and/or other controllable circuit elements. As shown, switch 608 is in electrical communication with box control circuitry 610. In some examples, switch 608 may couple or decouple input device 602d and output device 604d in response to one or more signals received from the box control circuitry 610. For example, the box control circuitry 610 may determine the GTAW training system 100 is in a live arc mode, and send one or more signals to the switch 608 indicative of a command to close. In response, the switch 608 may close, thereby coupling together input device 602d and output device 604d, thereby allowing signals from the remote control 140 to be passed through from the input device 602d to the output device 604d, and then to the welding-type power supply 108. As a result, the welding-type power supply 108 may receive one or more signals from the remote control 140 commanding welding-type power and/or gas be delivered to the GTAW torch 400 (e.g., via input device 602b, output device 604b, input device 602c, and/or output device 604c). As another example, the box control circuitry 610 may determine the GTAW training system 100 is in a simulation mode, and send one or more signals to the switch 608 indicative of a command to open. In response, the switch 608 may open, thereby decoupling the input device 602d and output device 604d. As a result, signals from the remote control 140 may not be communicated from the input device 602d to the output device 604d, and/or to the welding-type power supply 108. As a result, the welding-type power supply 108 may not receive any signals from the remote control 140 commanding welding-type power and/or gas be delivered to the GTAW torch 400, and thus never send power or gas to the GTAW torch 400 in response.

In some examples, the input devices 602 and/or output devices 604 may comprise electrically conductive physical ports (e.g., male plugs or female sockets). For example, the input device 602a may be a signal connection port configured to electrically couple with a signal cable connectable to the training controller 200 (and/or welding stand 102). Likewise, the output device 604a may be a signal connection port configured to electrically couple with a signal cable connectable to the GTAW torch 400. As another example, the output device 604d may be a signal connection port configured to electrically couple with a signal cable connectable to the welding-type power supply 108. Likewise, the input device 602d may be a signal connection port configured to electrically couple with a signal cable connectable to the remote control 140 (and/or a remote control receiver/transceiver).

In some examples, the input device 602a and/or input device 602d may comprise input communication circuitry (e.g., one or more receivers, transceivers, and/or antennas) configured for wireless communication, rather than physical ports. In some examples, the output device 604a and/or output device 604d may comprise output communication circuitry (e.g., one or more transmitters, transceivers, and/or antennas) configured for wireless communication, rather than physical ports. In such examples, the communication circuitry may be configured to wirelessly communicate with the training controller 200, welding-type power supply 108, GTAW torch 400, and/or remote control 140 (and/or corresponding complementary communication circuitry of the training controller 200, welding-type power supply 108, GTAW torch 400, and/or remote control 140).

In some examples, the input device 602b may comprise an electrically conductive physical power connection port (e.g., male plug or female socket) configured to electrically couple with a power cable connectable to the welding-type power supply 108. In some examples, the output device 604b may comprise an electrically conductive physical power connection port (e.g., male plug or female socket) configured to electrically couple with a power cable connectable to the GTAW torch 400. In some examples, the input device 602b and/or output device 604b may be configured to handle higher voltages, currents, and/or power than the input device 602a, input device 602d, output device 604a, and/or output device 604d.

In some examples, the input device 602c may comprise a physical gas connection port (male or female) configured to couple with a gas cable connectable with the gas supply 142 of the welding-type power supply 108. In some examples, the output device 604c may comprise a physical gas connection port (male or female) configured to couple with a gas cable connectable with the GTAW torch 400. In some examples, the input device 602c and/or output device 604c may be omitted, and/or gas may instead be routed outside of the connection box 600. While depicted as separate input devices 602 in the example of FIG. 6, in some examples, the output device 604d, input device 602b, and/or input device 602c may be combined into a single device, and/or be configured to connect to a single cable (e.g., a U.S. or European Dinse or Tweco style cable). Likewise, in some examples, the output device 604b and/or output device 604c may be combined into a single device, and/or be configured to connect to a single cable (e.g., a U.S. or European Dinse or Tweco style cable).

In the example of FIG. 6, a power line 612 electrically couples the input device 602b to the output device 604b. In some examples, the power line 612 may be configured to handle high voltage and/or current welding-type power outputted by the welding-type power supply 108 for use in arc welding by the GTAW torch 400. As shown, a gas line 614 fluidly couples the input device 602c and output device 604c. In the example of FIG. 6, the connection box 600 includes a voltage sensor 606a and current sensor 606b in electrical communication with the power line 612, and a gas flow sensor 606c in fluid communication with the gas line 614. In some examples, the gas flow sensor 606c may be configured to sense, detect, and/or measure gas flow through the gas line 614. In some examples, the current sensor 606b may be configured to sense, detect, and/or measure electrical current through the power line 612.

In some examples, the voltage sensor 606a may be configured to sense, detect, and/or measure electrical voltage at the power line 612. In the example of FIG. 6, the voltage sensor 606a is electrically connected to both the power line 612 and an electrical ground 616. Thus, in some examples, the voltage sensor 606a may sense, detect, and/or measure an electrical voltage differential between the power line 612 and electrical ground 616. In some examples, a second (clamp) power line (e.g., for the clamp 114) may be routed through the connection box 600, and the voltage sensor 606 may instead sense, detect, and/or measure an electrical voltage differential between the GTAW torch power line 612 and the clamp power line.

In the example of FIG. 6, the box sensors 606 are in electrical communication with the box control circuitry 610. In some examples, the box control circuitry 610 may receive one or more signals from the box sensors 606 indicative of their detections and/or measurements. In some examples, the box control circuitry 610 may send one or more control signals to the box sensors 606 to control their operation. In some examples, the box control circuitry 610 may communicate the detections and/or measurements of the box sensors 606 to the training controller 200 via the input device 602a.

In the example of FIG. 6, the box control circuitry 610 is also in electrical communication with the input device 602a, output device 604a, and input device 602d. In some examples, input device 602a and output device 604a may act as both input and output devices, in they may act as a conduit for both output signals from the box control circuitry 610 (e.g., to the training controller 200 and/or GTAW torch 400) and input signals to the box control circuitry 610 signals (e.g., from the training controller 200 and/or GTAW torch 400). For example, the box control circuitry 610 may communicate control signals received from the remote control 140 via input device 602d to the training controller 200 through input device 602a (e.g., so that training controller 200 can detect activation signals, etc.). Because the box control circuitry 610 is in electrical communication with the input device 602d, the box control circuitry 610 may be able to receive control signals from the remote control 140 regardless of whether the GTAW training system 100 is in a live arc mode or simulation mode (and/or the corresponding state of switch 608). Thus, input device 602a may act as both an input and output device in that it may act as a conduit for both input signals from the training controller 200 and output signals to the training controller 200. As another example, the box control circuitry 610 may communicate the mode state (e.g., live arc or simulation) to the GTAW torch 400 via the output device 604a, so that the GTAW torch 400 may provide a corresponding indication via the torch outputs 418. Additionally, the GTAW torch 400 may send one or more control signals to the box control circuitry 610, via the output device 604a, indicative of some operator selection (e.g., of live arc mode or simulation mode) via the torch inputs 416. Thus, output device 604a may act as both an input and output device in that it may act as a conduit for both input signals from the GTAW torch 400 and output signals to GTAW torch 400.

In the example of FIG. 6, the box control circuitry 610 includes box processing circuitry 620 and box memory circuitry 622. In some examples, the box processing circuitry 620 may include one or more processors. In some examples, the box memory circuitry 622 may store machine readable (and/or processor executable) instructions. In some examples, the box control circuitry 610 (and/or box memory circuitry 622 and/or box processing circuitry 624) may comprise discrete and/or analog circuitry.

Figure 7:
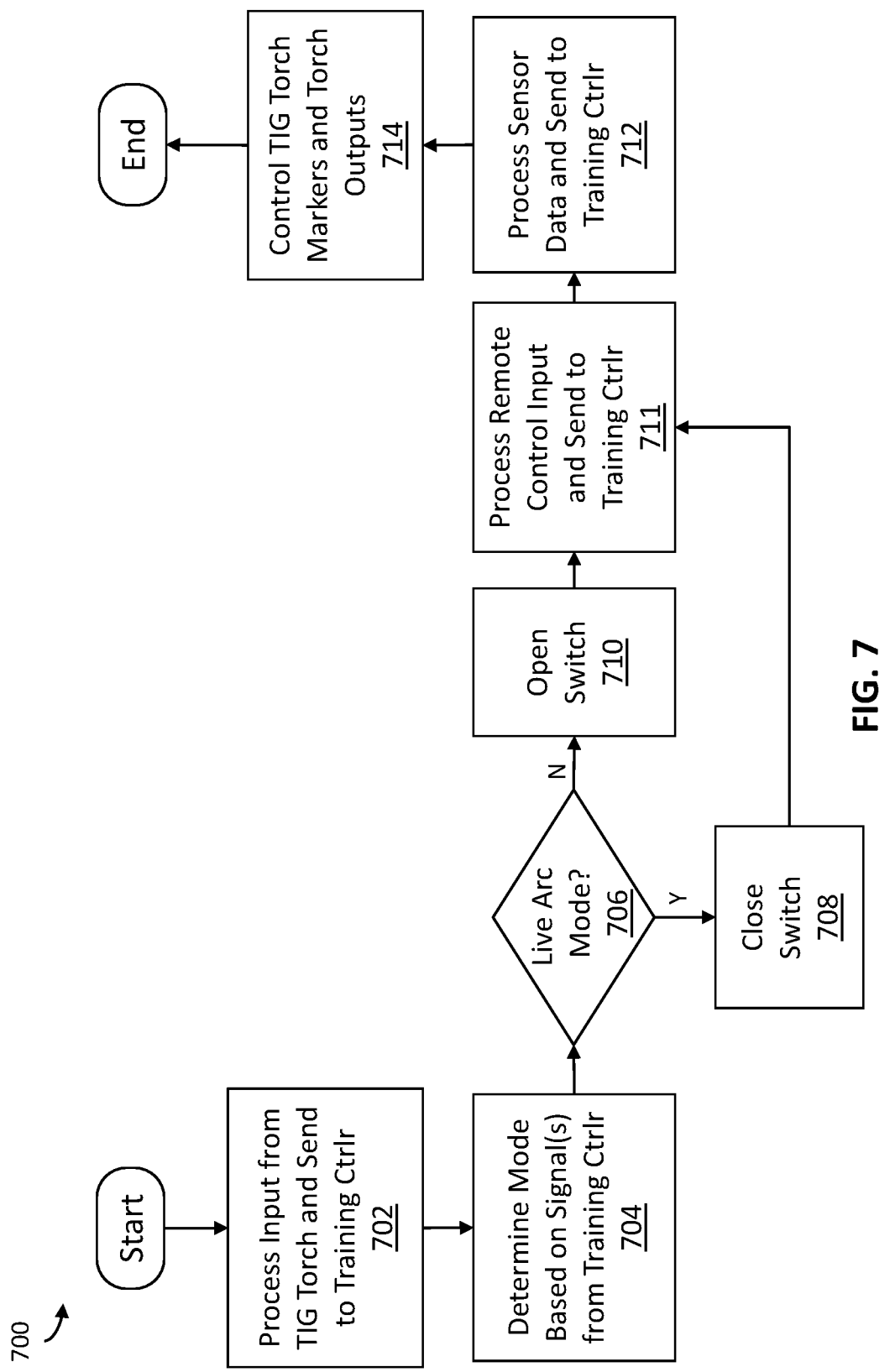
FIG. 7 is a flowchart illustrating an example box control method that may be used with the connection box of FIG. 6, in accordance with aspects of this disclosure.

FIG. 7 shows a flowchart illustrating an example box control method 700. As shown, the box control method 700 illustrates the operation of the box control circuitry 610. In some examples, some or all of the box control method 700 may be implemented in machine readable instructions stored in the box memory circuitry 622 and/or executed by the box processing circuitry 620 of the connection box 600. In some examples, some or all of the box control method 700 may be implemented in analog and/or discrete circuitry.

In the example of FIG. 7, the box control method 700 begins at block 702, where the box control circuitry 610 receives input from the GTAW torch 400 via output device 604a. In some examples, the input may be one or more signals sent from the GTAW torch 400 in response to input received via the torch inputs 416. For example, one or more of the torch inputs 416 may be used to command a particular mode (e.g., live arc mode or simulation mode). The box control circuitry 610 may process the inputs and/or forward to the training controller 200 via the input device 602a. After block 702, the method 700 proceeds to block 704, where the box control circuitry 610 determines the mode (e.g., live arc or simulation) of the GTAW training system 100. In some examples, the determination may be made based on one or more signals received from the training controller 200 via the input device 602a. For example, the training controller 200 may change the mode based on inputs from the GTAW torch 400 and/or send one or more signals indicative of the mode to the box control circuitry 610 via the input device 602a. Alternatively, the training controller 200 may send one or more signals indicating the mode has not changed, despite input from the GTAW torch 400 (e.g., where the GTAW training system 100 is no longer in the setup/calibration phase or other appropriate phase).

In the example of FIG. 7, the method 700 proceeds to block 706 after block 704. At block 706 the method 700 determines whether the mode is a live arc mode. If the GTAW training system 100 is in a live arc mode, the method proceeds to block 708, where the box control circuitry 610 sends one or more control signals to close the switch 608. Closing the switch 608 couples the input device 602d to the output device 604d, and enables the welding-type power supply 108 to receive signals from the remote control 140. If the GTAW training system 100 is not in a live arc mode, the method proceeds to block 710, where the box control circuitry 610 sends one or more control signals to open the switch 608, thereby decoupling the input device 602d from the output device 604d, and prohibiting the welding-type power supply 108 from receiving signals from the remote control 140. While block 706 is depicted as determining whether the GTAW training system 100 is in a live arc mode, in some examples, the block 706 may alternatively, or additionally, comprise determining whether the GTAW training system 100 is in a simulation mode or other mode. After blocks 708 and/or 710, the method proceeds to block 711.

In the example of FIG. 7, the method 700 processes and/or analyzes one or more control signals received from the remote control 140 (e.g., via input device 602d), and/or sends the one or more control signals to the training controller 200 at block 711. As shown, the control signals are sent to the training controller 200 regardless of whether block 708 or 710 executes. Thus, the weld training program 300 of the training controller 200 can use the remote control signal(s) regardless of whether the GTAW training system 100 is in live arc mode, simulation mode, or some other mode (and/or whether switch 608 is opened or closed. After block 711, the method 700 proceeds to block 712.

In the example of FIG. 7, the method 700 processes and/or analyzes data received from the box sensors 606, and/or sends the box sensor data to the training controller 200 at block 712. In some examples, the box sensor data may be used by the training controller 200 to determine one or more parameters (e.g., at block 308 of FIG. 3) and/or training results (e.g., at block 312 of FIG. 3). As shown, the method 700 proceeds to block 714 after block 712. At block 714, the method 700 sends one or more control signals to the GTAW torch 400 via the output device 604a to control the torch markers 413, torch outputs 418, and/or feedback mechanism 420. For example, the box control circuitry 610 may control one or more torch markers 413 (and/or groups of torch markers 413) to activate and/or deactivate to facilitate detection and/or tracking by the GTAW training system 100. In some examples, the box control circuitry 610 may use one or more signals received from the training controller 200 to determine how to control the torch markers 413. For example, the training controller 200 may provide one or more signals to the box control circuitry 610 indicative of data captured by the sensors 104 and/or the tracking operation, and the box control circuitry 610 may control the torch markers 413 based on the one or more signals. As another example, the box control circuitry 610 may activate and/or deactivate one or more of the torch outputs 418 to indicate the mode of the GTAW training system 100 and/or whether the GTAW training system 100 is in a state where the mode can be changed. As yet another example, the box control circuitry 610 may send one or more signals to the feedback mechanism 420 indicative of a command to activate/deactivate (and/or operate at some level), such as in response to one or more parameters and/or training results communicated by the training controller 200. While the method 700 is depicted as ending after block 714, in some examples, the method 700 may restart at block 702 after ending.

The present disclosure describes a GTAW training system 100 that uses torch markers 413, a filler rod attachment 500 with attachment markers 513, and a connection box 600 to facilitate training in the unique context of a gas tungsten arc welding system. Given the dearth of welding expertise in the industry, and the uniqueness of GTAW welding, training systems like the disclosed GTAW training system 100 serve an important function. Additionally, the ability of the GTAW training system to operate in both a live arc and simulation mode means that individuals can hone their skills in a simulated environment before tackling real live welding, and receive valuable feedback for both.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit (and/or control circuitry) may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

What is claimed is:

1. A connection box of a gas tungsten arc weld (GTAW) training system, comprising:
    a connection box housing;
    a power input port configured for connection to a welding-type power supply;
    a power output port configured for connection to a GTAW welding torch;
    a power line that constantly connects together the power input port and the power output port, the power line being housed within the connection box housing;
    a remote control input device configured to receive a remote control signal from a remote control for the GTAW welding torch, the remote control input device being at least partly housed within the connection box housing;
    a remote control output device configured to provide the remote control signal received at the remote control input device to a welding-type power supply when the remote control output device is coupled to the remote control input device, the remote control output device being at least partly housed within the connection box housing;
    a switch configured to selectively couple the remote control input device to the remote control output device, the switch being housed within the connection box housing; and control circuitry in electrical communication with the remote control input device, the control circuitry being housed within the connection box housing, the control circuitry configured to:
        receive the remote control signal from the remote control input device;
        provide a training signal representative of the remote control signal to a weld training controller;
        in a live arc mode, control the switch to selectively couple the remote control input device to the remote control output device to enable communication of the remote control signal to the welding-type power supply; and
        in a simulation mode, control the switch to selectively decouple the remote control input device from the remote control output device to prevent communication of the remote control signal to the welding-type power supply.

2. The connection box of claim 1, wherein the remote control input device comprises an input port or input communication circuitry, and the remote control output device comprises an output port or output communication circuitry.

3. The connection box of claim 1, wherein the remote control comprises a foot pedal.

4. The connection box of claim 1, further comprising:
    a gas input port configured to receive a shielding gas from a gas supply, the gas input port being at least partly housed within the connection box housing;
    a gas output port configured to provide the shielding gas to the GTAW welding torch, the gas output port being at least partly housed within the connection box housing; and
    a gas line connecting the gas input port to the gas output port, the gas line being housed within the connection box housing.

5. The connection box of claim 4, further comprising: a gas sensor configured to measure a gas flow of the shielding gas through the gas line, the gas sensor being housed within the connection box housing, the gas sensor being in electrical communication with the control circuitry, and the control circuitry being further configured to provide a signal representative of the gas flow to the weld training controller.

6. The connection box of claim 1, further comprising a sensor in electrical communication with the control circuitry and power line, the sensor configured to detect a current or voltage at the power line.

7. The connection box of claim 5, wherein the control circuitry is further configured to provide a signal representative of the current or voltage to the weld training controller.

8. The connection box of claim 1, further comprising a torch connection device configured for electrical connection to the GTAW welding torch, the control circuitry configured to provide one or more torch output signals to the GTAW welding torch via the torch connection device.

9. The connection box of claim 8, wherein the control circuitry is further configured to receive one or more torch input signals from the GTAW welding torch via the torch connection device, the one or more torch input signals being representative of a selection of the live arc mode or the simulation mode.

10. The connection box of claim 1, wherein the training signal comprises a training output signal, the connection box further comprising a training connection device configured for electrical connection to the weld training controller, the control circuitry configured to provide the training output signal to the weld training controller via the training connection device, wherein the control circuitry is further configured to receive one or more training input signals from the weld training controller via the training connection device, the one or more training input signals being representative of the live arc mode or the simulation mode.

11. A method for operating a connection box of a GTAW training system, the method comprising:
receiving, at the connection box, a remote control signal from a remote control of a GTAW welding torch via a remote control input device of the connection box, the GTAW welding torch being separate from the connection box, and the remote control input device being at least partly housed within a connection box housing of the connection box;
providing, from the connection box, a training signal representative of the remote control signal to a weld training controller via a training connection device of the connection box, the training connection device being at least partly housed within the connection box housing;
determining, using control circuitry of the connection box, a mode of the GTAW training system, the control circuitry being housed within the connection box housing; and
in a live arc mode, providing the remote control signal to a welding-type power supply by controlling a switch of the connection box to selectively couple the remote control input device to a remote control output device of the connection box, the switch being housed within the connection box housing, and in a simulation mode, preventing the remote control signal from being provided to the welding-type power supply by controlling the switch to selectively decouple the remote control input device from the remote control output device of the connection box; and
measuring, via a sensor of the connection box housed within the connection box housing, a current or voltage at a power line of the connection box, the power line being housed within the connection box housing, the power line constantly connecting together a power input port of the connection box and a power output port of the connection box, the power input port being configured for electrical connection to the welding-type power supply, and the power output port being configured for electrical connection to the GTAW welding torch.

12. The method of claim 11, further comprising receiving a mode signal from the weld training controller via the training connection device, the mode signal being representative of the live arc mode or the simulation mode.

13. The method of claim 11, wherein the remote control output device is configured to couple to the welding-type power supply.

14. The method of claim 11, further comprising measuring, via a sensor of the connection box, a gas flow through a gas line of the connection box, the gas line and the sensor being housed within the connection box housing, the gas line connecting a gas input port of the connection box with a gas outlet port of the connection box, the gas outlet port being configured for connection to the GTAW torch.

15. The method of claim 11, wherein the remote control comprises a foot pedal.

16. The method of claim 11, further comprising receiving one or more torch input signals from the GTAW welding torch via a torch connection device of the connection box, and sending the one or more torch input signals to the weld training controller via the training connection device, the one or more torch input signals being representative of a selection of the live arc mode or the simulation mode.

17. The method of claim 16, further comprising controlling, via the torch connection device of the connection box, one or more torch output indicators, or one or more torch markers, of the GTAW welding torch.

18. The method of claim 14, further comprising sending one or more signals representative of the gas flow to the training controller via the training connection device.

19. The method of claim 11, further comprising sending one or more signals representative of the current to the training controller via the training connection device.

20. The method of claim 11, further comprising sending one or more signals representative of the voltage to the training controller via the training connection device.

* * * * *